(12) United States Patent
Lu et al.

(10) Patent No.: US 10,397,125 B2
(45) Date of Patent: Aug. 27, 2019

(54) METHOD OF CROSS-REGIONAL DATA TRANSMISSION AND SYSTEM THEREOF

(71) Applicant: Alibaba Group Holding Limited, Grand Cayman (KY)

(72) Inventors: Yijun Lu, Hangzhou (CN); Yunfeng Tao, Hangzhou (CN); Zhiyang Tang, Hangzhou (CN); Yunfeng Zhu, Hangzhou (CN); Lin Cheng, Hangzhou (CN); Kaige An, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 189 days.

(21) Appl. No.: 15/453,821

(22) Filed: Mar. 8, 2017

(65) Prior Publication Data

US 2017/0264559 A1    Sep. 14, 2017

(30) Foreign Application Priority Data

Mar. 9, 2016   (CN) .......................... 2016 1 0134307

(51) Int. Cl.
*H04L 12/835* (2013.01)
*H04L 29/06* (2006.01)
(Continued)

(52) U.S. Cl.
CPC .......... *H04L 47/30* (2013.01); *H04L 67/1095* (2013.01); *H04L 67/26* (2013.01); *H04L 69/06* (2013.01); *H04L 69/40* (2013.01)

(58) Field of Classification Search
CPC ..... H04L 47/30; H04L 67/26; H04L 67/1095; H04L 69/06; H04L 69/40
See application file for complete search history.

(56) References Cited

U.S. PATENT DOCUMENTS

| 7,484,119 B2* | 1/2009 | Fisher | G06F 11/1461 707/999.202 |
| 7,774,329 B1* | 8/2010 | Peddy | G06Q 30/02 707/705 |

(Continued)

OTHER PUBLICATIONS

PCT Search Report and Written Opinion dated May 23, 2017 for PCT Application No. PCT/US17/21443, 14 pages.

*Primary Examiner* — George C Neurauter, Jr.
(74) *Attorney, Agent, or Firm* — Lee & Hayes, P.C.

(57) ABSTRACT

The present disclosure is directed to a cross-regional data transmission method and device. Metadata information sent by a corresponding client device is acquired, and the metadata information is sent to a corresponding metadata transmission node device, wherein the metadata information includes data replication progress information of the corresponding client device; to-be-forwarded data information sent by the corresponding metadata transmission node device is acquired, and the to-be-forwarded data information is pushed to the corresponding client device, wherein the to-be-forwarded data information includes data replication progress information of another client device, so that the metadata information sent by the corresponding client device is effectively sent to the corresponding metadata transmission node device; and the acquired to-be-forwarded data information sent by the corresponding metadata transmission node device is pushed to the corresponding client device, to achieve synchronization of the metadata information.

18 Claims, 11 Drawing Sheets

(51) Int. Cl.
*H04L 29/08* (2006.01)
*H04L 29/14* (2006.01)

(56) References Cited

U.S. PATENT DOCUMENTS

| | | |
|---|---|---|
| 8,073,922 B2 | 12/2011 | Bates |
| 8,144,714 B1 | 3/2012 | Buchko et al. |
| 8,271,468 B1* | 9/2012 | Peddy ................... G06Q 30/02 |
| | | 707/705 |
| 8,856,593 B2 | 10/2014 | Eckhardt et al. |
| 9,170,891 B1* | 10/2015 | Vincent ............... G06F 11/1451 |
| 9,274,863 B1* | 3/2016 | Qiu ..................... G06F 11/1474 |
| 9,501,379 B2* | 11/2016 | Gill ..................... G06F 11/3034 |
| 9,600,774 B1* | 3/2017 | Biemueller .......... G06N 99/005 |
| 9,639,589 B1* | 5/2017 | Theimer ............. G06F 11/1461 |
| 9,747,310 B2* | 8/2017 | Hsieh ................ G06F 17/30292 |
| 9,749,427 B2* | 8/2017 | Meng ...................... H04L 67/10 |
| 10,015,248 B1* | 7/2018 | Ullom ................ H04L 67/1095 |
| 2007/0055712 A1* | 3/2007 | Wolfgang ............... G06F 9/466 |
| 2008/0201542 A1* | 8/2008 | Maruyama ............ G06F 3/0607 |
| | | 711/165 |
| 2009/0313311 A1* | 12/2009 | Hoffmann ........... G06F 11/2094 |
| 2009/0320029 A1* | 12/2009 | Kottomtharayil ....... G06F 9/505 |
| | | 718/102 |
| 2010/0319005 A1* | 12/2010 | Erignac ..................... G06F 9/52 |
| | | 719/315 |
| 2011/0161294 A1* | 6/2011 | Vengerov .......... G06F 17/30581 |
| | | 707/637 |
| 2011/0260879 A1* | 10/2011 | Avner ................. G06F 11/0748 |
| | | 340/679 |
| 2012/0137094 A1* | 5/2012 | Gupta ............... G06F 17/30212 |
| | | 711/162 |
| 2014/0006458 A1* | 1/2014 | Hsieh ................ G06F 17/30292 |
| | | 707/803 |
| 2014/0244584 A1 | 8/2014 | Song et al. |
| 2014/0279885 A1 | 9/2014 | Anantharam et al. |
| 2014/0344222 A1* | 11/2014 | Morris .............. G06F 17/30215 |
| | | 707/634 |
| 2014/0351216 A1 | 11/2014 | Thiel et al. |
| 2015/0106328 A1 | 4/2015 | Beach et al. |
| 2015/0186229 A1 | 7/2015 | Bortnikov et al. |
| 2015/0242478 A1 | 8/2015 | Cantwell et al. |
| 2016/0006779 A1* | 1/2016 | Zhou ...................... H04L 65/60 |
| | | 709/231 |
| 2016/0156502 A1* | 6/2016 | Fugitt ..................... H04L 41/30 |
| | | 709/205 |
| 2016/0217194 A1 | 7/2016 | Poluri et al. |
| 2016/0292608 A1* | 10/2016 | Yin .................. G06Q 10/06315 |
| 2017/0032012 A1 | 2/2017 | Zhang et al. |
| 2017/0054802 A1* | 2/2017 | Annamalai ........ H04L 67/1095 |
| 2017/0123945 A1* | 5/2017 | Panasko ............. G06F 11/2094 |
| 2017/0177277 A1* | 6/2017 | Laden .................. G06F 3/0659 |
| 2017/0235645 A1* | 8/2017 | Theimer ............. G06F 11/1461 |
| | | 707/634 |
| 2017/0357674 A1* | 12/2017 | Hsieh ................ G06F 17/30292 |
| 2018/0039899 A1* | 2/2018 | Biemueller .......... G06N 99/005 |
| 2018/0165343 A1* | 6/2018 | Fan ................... G06F 17/30581 |
| 2018/0268042 A1* | 9/2018 | Wu .................... G06F 17/30575 |

\* cited by examiner

METHOD OF CROSS-REGIONAL DATA TRANSMISSION AND SYSTEM THEREOF

CROSS REFERENCE TO RELATED PATENT APPLICATIONS

This application claims priority to Chinese Patent Application No. 201610134307.X, filed on Mar. 9, 2016, entitled "Cross-Regional Data Transmission Method and Device," which is hereby incorporated by reference in its entirety.

TECHNICAL FIELD

The present disclosure relates to the field of computers, and in particular, to a cross-regional data transmission technology.

BACKGROUND

Remote data replication is an important part of the Internet, and is widely applied to a computer network environment. Data remote replication includes synchronous replication and asynchronous replication.

In conventional techniques, in a scenario of a small delay (e.g., from Hangzhou to Shanghai), the delay of the synchronous replication may be ignored, which has little effect on the application, wherein an industry standard of multi-regional synchronous replication is a protocol for distributed consensus (such as Paxos protocol). In the asynchronous replication, a sender can resume the logic of the sender (e.g., a non-relational database service (AWS DynamoDB Streaming)) without waiting for a receiver to confirm reception; further, the asynchronous replication employing a transfer service manner provides data consistency maintenance of eventual consistency, and in a transfer service mode, a shared log function with strong consistency takes the place of a data replication mechanism built in an application, which, by replicating a link (e.g., AWS S3 meta consistency maintenance) or pushing some logic to a client terminal (e.g., Clusters of Raw Flash Units), can provide guarantee of data reliability itself.

In a cross-regional scenario, network delay between various regions may reach more than 100 ms. As the delay of the synchronous replication is greater in the cross-regional scenario, the synchronous replication is generally not employed for long-distance data transmission, but the asynchronous replication with strong consistency support and a high throughput rate is employed. During direct asynchronous replication, as the delay is longer, the sender needs to buffer a great amount of data, which may create pressure on the memory of the sender, so that better expansion is impossible. For the shared log function with strong consistency in the transfer service mode, as it is necessary to solve the problem of reliability of the data on a log when a node on the log fails, the logic is relatively complicated, the delay may also be much higher than that of asynchronous replication of local data, and at the same time, a Recovery Point Objective (RPO) cannot be ensured in the case of service failover.

Therefore, in the conventional techniques, the use of the asynchronous replication with strong consistency support and a high throughput rate in the cross-regional scenario results in that the delay of data synchronization is longer and at the same time, the recovery point objective cannot be ensured in the case of service failover.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide a cross-regional data transmission method and device, to solve the problem in the conventional techniques that the use of the asynchronous replication with strong consistency support and a high throughput rate in a cross-regional scenario results in that the delay of data synchronization is longer and at the same time, the recovery point objective cannot be ensured in the case of service failover.

According to an aspect of the present disclosure, a cross-regional data transmission method at a metadata client access device terminal is provided, including:

acquiring metadata information sent by a corresponding client device, and sending the metadata information to a corresponding metadata transmission node device, wherein the metadata information includes data replication progress information of the corresponding client device; and acquiring to-be-forwarded data information sent by the corresponding metadata transmission node device, and pushing the to-be-forwarded data information to the corresponding client device, wherein the to-be-forwarded data information includes data replication progress information of another client device.

According to an aspect of the present disclosure, a cross-regional data transmission method at a metadata transmission node device terminal is provided, including:

receiving metadata information of a corresponding client device sent by a corresponding metadata client access device, and sending the metadata information to another metadata transmission node device, wherein the metadata information includes data replication progress information of the corresponding client device;

receiving to-be-forwarded data information sent by a corresponding upper-level metadata transmission node device, processing the to-be-forwarded data information and then sending the processed to-be-forwarded data information to a corresponding lower-level metadata transmission node device, wherein the to-be-forwarded data information includes data replication progress information of another client device; and forwarding the to-be-forwarded data information relevant to the corresponding client device to the corresponding metadata client access device.

According to an aspect of the present disclosure, a cross-regional data transmission method at a device equipped with a protocol for globally distributed consensus terminal is provided, including:

receiving a first node device configuration request sent by a metadata client access device based on failure of a corresponding metadata transmission node device;

receiving a second node device configuration request sent by the metadata transmission node device based on failure of a lower-level metadata transmission node device;

updating the corresponding metadata transmission node device based on the first node device configuration request and/or the second node device configuration request; and acquiring a current node state sent by the metadata transmission node device periodically.

According to an aspect of the present disclosure, a cross-regional data transmission method at a client device terminal is provided, including:

acquiring database data information sent by another client device through a data transmission channel;

determining corresponding metadata information based on the database data information, wherein the metadata information includes data replication progress information of the corresponding client device, and sending the metadata information to a corresponding metadata client access device; and receiving to-be-forwarded data information pushed by the corresponding metadata client access device, wherein the to-be-forwarded data information includes data replication progress information of another corresponding client device, and determining, based on the to-be-forwarded data information, whether to continue to submit the corresponding database data information.

According to another aspect of the present disclosure, a metadata client access device for cross-regional data transmission is further provided, including:

an acquisition unit configured to acquire metadata information sent by a corresponding client device, and send the metadata information to a corresponding metadata transmission node device, wherein the metadata information includes data replication progress information of the corresponding client device; and a pushing unit configured to acquire to-be-forwarded data information sent by the corresponding metadata transmission node device, and push the to-be-forwarded data information to the corresponding client device, wherein the to-be-forwarded data information includes data replication progress information of another client device.

According to an aspect of the present disclosure, a cross-regional data transmission method at a metadata transmission node device is provided, including:

a first reception unit configured to receive metadata information of a corresponding client device sent by a corresponding metadata client access device, and send the metadata information to another metadata transmission node device, wherein the metadata information includes data replication progress information of the corresponding client device;

a first forwarding unit configured to receive to-be-forwarded data information sent by a corresponding upper-level metadata transmission node device, process the to-be-forwarded data information and then send the processed to-be-forwarded data information to a corresponding lower-level metadata transmission node device, wherein the to-be-forwarded data information includes data replication progress information of another client device; and a second forwarding unit configured to forward the to-be-forwarded data information relevant to the corresponding client device to the corresponding metadata client access device.

According to an aspect of the present disclosure, a cross-regional data transmission method at a device equipped with a protocol for globally distributed consensus terminal is provided, including:

a second reception unit configured to receive a first node device configuration request sent by a metadata client access device based on failure of a corresponding metadata transmission node device;

a third reception unit configured to receive a second node device configuration request sent by the metadata transmission node device based on failure of a lower-level metadata transmission node device;

an update unit configured to update the corresponding metadata transmission node device based on the first node device configuration request and/or the second node device configuration request; and an acquisition unit configured to acquire a current node state sent by the metadata transmission node device periodically.

According to an aspect of the present disclosure, a cross-regional data transmission method at a client device terminal is provided, including:

a third acquisition unit configured to acquire database data information sent by another client device through a data transmission channel;

a sending unit configured to determine corresponding metadata information based on the database data information, wherein the metadata information includes data replication progress information of the corresponding client device, and send the metadata information to a corresponding metadata client access device; and a determination unit configured to receive to-be-forwarded data information pushed by the corresponding metadata client access device, wherein the to-be-forwarded data information includes data replication progress information of another corresponding client device, and determine, based on the to-be-forwarded data information, whether to continue to submit the corresponding database data information.

According to a further aspect of the present disclosure, a cross-regional data transmission system is provided, wherein the system includes: a metadata client access device, a metadata transmission node device, and a client device, wherein the metadata client access device includes: a first acquisition unit configured to acquire metadata information sent by a corresponding client device, and send the metadata information to a corresponding metadata transmission node device, wherein the metadata information includes data replication progress information of the corresponding client device; and a pushing unit configured to acquire to-be-forwarded data information sent by the corresponding metadata transmission node device, and push the to-be-forwarded data information to the corresponding client device, wherein the to-be-forwarded data information includes data replication progress information of another client device;

the metadata transmission node device includes: a first reception unit configured to receive metadata information of a corresponding client device sent by a corresponding metadata client access device, and send the metadata information to another metadata transmission node device, wherein the metadata information includes data replication progress information of the corresponding client device; a first forwarding unit configured to receive to-be-forwarded data information sent by a corresponding upper-level metadata transmission node device, process the to-be-forwarded data information and then send the processed to-be-forwarded data information to a corresponding lower-level metadata transmission node device, wherein the to-be-forwarded data information includes data replication progress information of another client device; and a second forwarding unit configured to forward the to-be-forwarded data information relevant to the corresponding client device to the corresponding metadata client access device; and the client device includes: a third acquisition unit configured to acquire database data information sent by another client device through a data transmission channel; a sending unit configured to determine corresponding metadata information based on the database data information, wherein the metadata information includes data replication progress information of the corresponding client device, and send the metadata information to a corresponding metadata client access device; and a determination unit configured to receive to-be-forwarded data information pushed by the corresponding metadata client access device, wherein the to-be-forwarded data information includes data replication progress information of another corresponding client device, and determine, based on the to-be-forwarded data information, whether to continue to submit the corresponding database data information.

Further, the system further includes: a device equipped with a protocol for globally distributed consensus, the first acquisition unit is further configured to: send, when the corresponding metadata transmission node device fails, a first node device configuration request to the device equipped with a protocol for globally distributed consensus, to acquire an updated corresponding metadata transmission node device, and send the metadata information to the updated metadata transmission node device; the first forwarding unit is further configured to: send, when the corresponding lower-level metadata transmission node device fails, a second node device configuration request to the device equipped with a protocol for globally distributed consensus, to acquire an updated corresponding lower-level metadata transmission node device; and the metadata transmission node device is further configured to: send a current node state to the device equipped with a protocol for globally distributed consensus periodically; and the device equipped with a protocol for globally distributed consensus includes: a second reception unit configured to receive the first node device configuration request sent by the metadata client access device based on failure of the corresponding metadata transmission node device; a third reception unit configured to receive the second node device configuration request sent by the metadata transmission node device based on failure of a lower-level metadata transmission node device thereof; an update unit configured to update the corresponding metadata transmission node device based on the first node device configuration request and/or the second node device configuration request; and a second acquisition unit configured to acquire the current node state sent by the metadata transmission node device periodically.

Compared with the conventional techniques, according to the cross-regional data transmission method and device in the example embodiments of the present disclosure, metadata information sent by a corresponding client device is acquired, and the metadata information is sent to a corresponding metadata transmission node device, wherein the metadata information includes data replication progress information of the corresponding client device. To-be-forwarded data information sent by the corresponding metadata transmission node device is acquired, and the to-be-forwarded data information is pushed to the corresponding client device, wherein the to-be-forwarded data information includes data replication progress information of another client device, so that the metadata information sent by the corresponding client device is effectively sent to the corresponding metadata transmission node device. The acquired to-be-forwarded data information sent by the corresponding metadata transmission node device is pushed to the corresponding client device, to achieve synchronization of the metadata information.

Further, according to the cross-regional data transmission method and device in the example embodiments of the present disclosure, metadata information of a corresponding client device sent by a corresponding metadata client access device is received, wherein the metadata information includes data replication progress information of the corresponding client device, and the metadata information is sent to another metadata transmission node device. Further, to-be-forwarded data information sent by a corresponding upper-level metadata transmission node device is received, and the to-be-forwarded data information is processed and then sent to a corresponding lower-level metadata transmission node device, wherein the to-be-forwarded data information includes data replication progress information of another client device. The to-be-forwarded data information relevant to the corresponding client device is forwarded to the corresponding metadata client access device, and metadata information of the corresponding client device sent from the corresponding metadata client access device is effectively sent to another metadata transmission node device; and the to-be-forwarded data information sent by the corresponding upper-level metadata transmission node device is processed and then sent to the lower-level metadata transmission node device, until the to-be-forwarded data information is received by all the metadata transmission node devices, to ensure that the metadata transmission node device forwards the to-be-forwarded data information relevant to the corresponding client device to the corresponding metadata client access device, thus effectively ensuring a high throughput rate between the metadata transmission node devices in the cross-regional data transmission.

Further, according to the cross-regional data transmission method and device in the example embodiments of the present disclosure, a first node device configuration request sent by a metadata client access device based on failure of a corresponding metadata transmission node device is received; a second node device configuration request sent by the metadata transmission node device based on failure of a lower-level metadata transmission node device is received; the corresponding metadata transmission node device is updated based on the first node device configuration request and/or the second node device configuration request, so that the metadata transmission node device does not need to query the device equipped with a protocol for globally distributed consensus about configuration management and a configuration management problem of a low-frequency cross-regional metadata transmission node device in the case of service failover is solved effectively. Further, a current node state sent periodically by the metadata transmission node device is acquired, so that the device equipped with a protocol for globally distributed consensus updates the corresponding metadata transmission node device timely, to ensure a high throughput rate of the cross-regional data transmission.

Further, according to the cross-regional data transmission method and device in the example embodiments of the present disclosure, database data information sent by another client device through a data transmission channel is acquired; corresponding metadata information is determined based on the database data information, wherein the metadata information includes data replication progress information of the corresponding client device, and the metadata information is sent to a corresponding metadata client access device, which effectively ensures synchronization of the metadata information corresponding to the database data information. Further, to-be-forwarded data information pushed by the corresponding metadata client access device is received, wherein the to-be-forwarded data information includes data replication progress information of another corresponding client device, and it is determined, based on the to-be-forwarded data information, whether to continue to submit the corresponding database data information, which effectively ensures that synchronization delay of the database data information is not affected.

BRIEF DESCRIPTION OF THE DRAWINGS

The features, objectives, and advantages of the present disclosure will become more evident in the following detailed description innlcuding the example embodiments which are made with reference to the following accompanying drawings.

Identical or similar reference signs in the accompanying drawings represent identical or similar components.

DETAILED DESCRIPTION

The present disclosure is further described below in detail with reference to the accompanying drawings.

Figure 1:
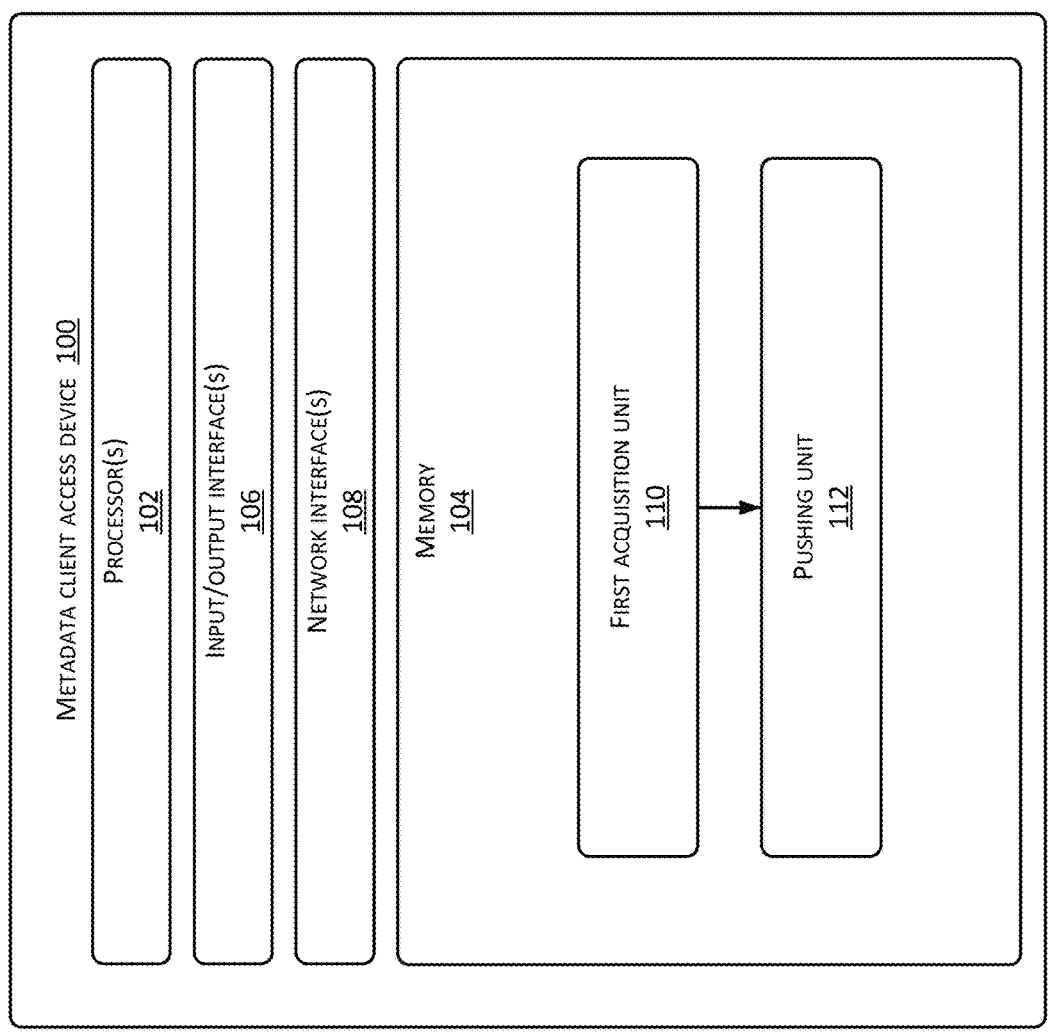
FIG. 1 is a schematic structural diagram of a metadata client access device for cross-regional data transmission according to an aspect of the present disclosure.

FIG. 1 is a schematic structural diagram of a metadata client access device for cross-regional data transmission according to an aspect of the present disclosure. The metadata client access device 100 includes one or more processor(s) 102 or data processing unit(s) and memory 104. The metadata client access device 100 may further include one or more input/output interface(s) 106, and network interface(s) 108. The memory 104 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 104 may store therein a plurality of modules or units including a first acquisition unit 110 and a pushing unit 112.

Wherein the first acquisition unit 110 acquires metadata information sent by a corresponding client device, and sends the metadata information to a corresponding metadata transmission node device, wherein the metadata information includes data replication progress information of the corresponding client device. The pushing unit 112 acquires to-be-forwarded data information sent by the corresponding metadata transmission node device, and pushes the to-be-forwarded data information to the corresponding client device, wherein the to-be-forwarded data information includes data replication progress information of another client device.

Herein, the metadata client access device 100 (meta client access layer) includes, but is not limited to, a device formed by a network device integrated through a network. The network device includes an electronic device capable of automatically performing numerical calculation and information processing according to a preset or pre-stored instruction, and hardware thereof includes, but is not limited to, a microprocessor, an application specific integrated circuit (ASIC), a field programmable gate array (FPGA), a digital signal processor (DSP), an embedded device, and the like. The network includes, but is not limited to, the Internet, a wide area network, a metropolitan area network, a local area network, a VPN network, a wireless Ad Hoc network, and the like. For example, the metadata client access device 100 may also be a script program run on a device that is formed by the user equipment integrated with the network device through the network. Certainly, those skilled in the art should understand that the metadata client access device 100 is merely an example, and other existing or future possible metadata client access devices 1, if applicable to the present disclosure, should also be included in the protection scope of the present disclosure, and be incorporated herein by reference.

The operations of the foregoing units are continuous, and herein, those skilled in the art should understand that the wording "continuous" means that the foregoing units separately operate in real time or according to requirements of a set or real-time adjusted operation mode. For example, the first acquisition unit 110 continuously acquires metadata information sent by a corresponding client device, and sends the metadata information to a corresponding metadata transmission node device, wherein the metadata information includes data replication progress information of the corresponding client device; the pushing unit 112 continuously acquires to-be-forwarded data information sent by the corresponding metadata transmission node device, and pushes the to-be-forwarded data information to the corresponding client device, wherein the to-be-forwarded data information includes data replication progress information of another client device, so that the metadata information sent by the corresponding client device is sent to the corresponding metadata transmission node device effectively; and the acquired to-be-forwarded data information sent by the corresponding metadata transmission node device is pushed to the corresponding client device, to achieve synchronization of the metadata information.

In an example embodiment of the present disclosure, the metadata client access device 100 (meta client access layer) is an interface device for carrying out a data transmission service between the client device and the metadata transmission node device.

In an example embodiment of the present disclosure, the metadata information includes data replication progress information of the corresponding client device, wherein the metadata information includes at least one of the following: a device ID of the corresponding client device, data replication progress information of the corresponding client device, and a device ID of a source client device corresponding to the data. Certainly, those skilled in the art should understand that the metadata information is merely an example, and other existing or future possible metadata information, if applicable to the present disclosure, should also be included in the protection scope of the present disclosure, and incorporated herein by reference.

For example, a source client device A replicates database data information into a corresponding client device B cross-regionally and synchronously, the corresponding client device B may notify a metadata client access device corresponding thereto in the form of metadata information, the metadata information acquired by the first acquisition unit 110 includes data replication progress information of the corresponding client device B, the source client device A corresponding to the data synchronously replicated, and synchronous replication thereof in the corresponding client device B, and the metadata information is sent to the corresponding metadata transmission node device.

In an example embodiment of the present disclosure, the to-be-forwarded data information includes data replication progress information of another client device. Wherein the to-be-forwarded data information includes data replication progress information of another client device and data type information of corresponding synchronous replication thereof, that is, the to-be-forwarded data information includes metadata information corresponding to another client device and data type information of corresponding synchronous replication thereof. Then, the to-be-forwarded data information includes at least one of the following: a device ID of the other client device, data replication progress information of the other client device, a device ID of a source client device corresponding to the data, and data type information of corresponding synchronous replication. Certainly, those skilled in the art should understand that the metadata information is merely an example, and other existing or future possible metadata information, if applicable to the present disclosure, should also be included in the protection scope of the present disclosure, and incorporated herein by reference.

For example, a client device C, a client device D, a client device E, and a client device F replicate the database data information of the source client device A cross-regionally and synchronously, respectively, and the to-be-forwarded data information includes data replication progress information of the source client device A and the another client device C corresponding thereto, data replication progress information of the another client device D corresponding thereto, data replication progress information of the corresponding another client device E and the corresponding another client device F, and data type information of corresponding synchronous replication; if the client device corresponding to the pushing unit 112 acquires and processes data information relevant to data in the to-be-forwarded data information synchronously replicated into the client device D, the pushing unit 112 pushes replication progress information of the client device D in the to-be-forwarded data information to the corresponding client device of the metadata client access device.

Further, the first acquisition unit 110 is further configured to: perform persistence processing on the metadata information, and then send persistence acknowledgement information to the corresponding client device.

It should be noted that the first acquisition unit 110 in the present disclosure may perform persistence processing on the metadata information by, but not limited to, a Paxos group. In an example embodiment of the present disclosure, For example, the persistence processing is performed on the metadata information by the Paxos group. Certainly, those skilled in the art should understand that the performing persistence processing on the metadata information by the Paxos group is merely an example embodiment of the present disclosure, and other existing or future possible manners capable of performing persistence processing on the metadata information, if applicable to the present disclosure, should also be included in the protection scope of the present disclosure, and incorporated herein by reference.

For example, the first acquisition unit 110 performs persistence processing on the metadata information by a Paxos group, and after writing the metadata information into a Paxos ring, sends persistence acknowledgement information to the corresponding client device, to make the client device, upon receipt of the persistence acknowledgement information, acknowledge that the metadata information is persisted.

Further, the first acquisition unit 110 is configured to: send, when the corresponding metadata transmission node device fails, a first node device configuration request to a device equipped with a protocol for globally distributed consensus, to acquire an updated corresponding metadata transmission node device, and send the metadata information to the updated metadata transmission node device.

In an example embodiment of the present disclosure, the first node device configuration request is, in the case that the corresponding metadata transmission node device fails, sent by the first acquisition unit 110 in the metadata client access device 100 to a device equipped with a protocol for globally distributed consensus, to acquire an updated corresponding metadata transmission node device, and the first acquisition unit 110 sends the metadata information to the updated metadata transmission node device.

Figure 2:
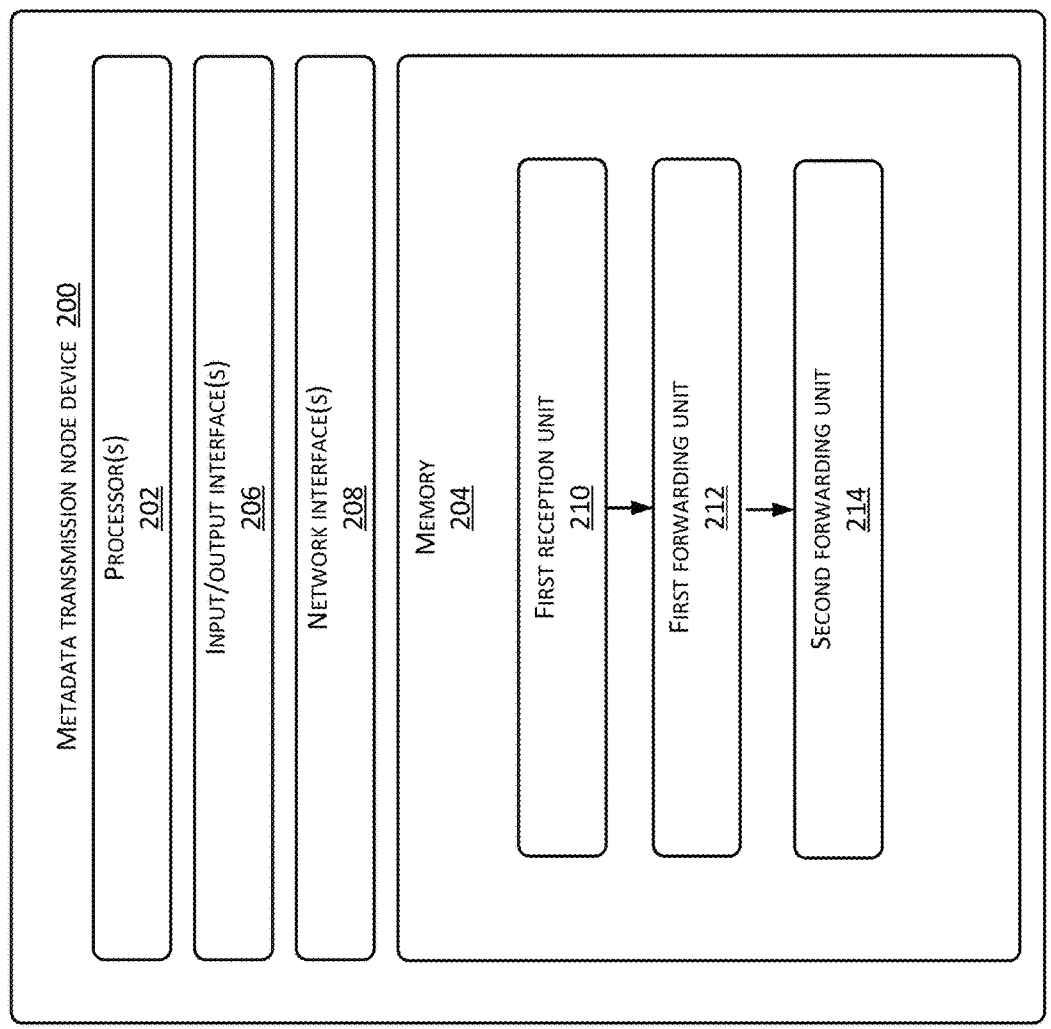
FIG. 2 is a schematic structural diagram of a metadata transmission node device for cross-regional data transmission according to an aspect of the present disclosure.

FIG. 2 is a schematic structural diagram of a metadata transmission node device 200 for cross-regional data transmission according to an aspect of the present disclosure. The metadata transmission node device 200 includes one or more processor(s) 202 or data processing unit(s) and memory 204. The metadata transmission node device 200 may further include one or more input/output interface(s) 206, and network interface(s) 208. The memory 204 is an example of computer readable media.

The memory 204 may store therein a plurality of modules or units including a first reception unit 210, a first forwarding unit 212, and a second forwarding unit 214.

Wherein the first reception unit 210 receives metadata information of a corresponding client device sent by a corresponding metadata client access device, and sends the metadata information to another metadata transmission node device; the first forwarding unit 212 receives to-be-forwarded data information sent by a corresponding upper-level metadata transmission node device, processes the to-be-forwarded data information and then sends the processed to-be-forwarded data information to a corresponding lower-level metadata transmission node device, wherein the to-be-forwarded data information includes data replication progress information of another client device; and the second forwarding unit 214 forwards the to-be-forwarded data information relevant to the corresponding client device to the corresponding metadata client access device.

It should be noted that there are two or more metadata transmission node devices, which are distributed in different regions. A connection structure between all the metadata transmission node devices may include, but not limited to, a ring structure and a topology structure. In an example embodiment of the present disclosure, the ring structure is the connection structure between all the metadata transmission node devices. Certainly, those skilled in the art should understand that the ring structure is merely an example embodiment of the connection structure between all the metadata transmission node devices, and other existing or future possible metadata transmission node devices, if applicable to the present disclosure, should also be included in the protection scope of the present disclosure, and incorporated herein by reference.

It should be noted that the metadata transmission node device 200 may include, but is not limited to, a node switch, a wireless network node device, and a repeater. In an example embodiment of the present disclosure, the repeater is, for example, the metadata transmission node device 200. Certainly, those skilled in the art should understand that the repeater is merely an example embodiment of the metadata transmission node device 200, and other existing or future possible metadata transmission node devices 200, if applicable to the present disclosure, should also be included in the protection scope of the present disclosure, and incorporated herein by reference.

In an example embodiment of the present disclosure, all the repeaters are deployed in various regions respectively, and jointly form a metadata transmission channel (meta transmission channel) with a ring structure. The first reception unit 210 in the metadata transmission node device 200 in the meta transmission channel receives metadata information about data synchronous replication performed in various regions sent from the corresponding metadata client access device 100, and adds the metadata information to a batch to be sent next time, to send the metadata information to another metadata transmission node device.

It should be noted that, in the first forwarding unit 212, the upper-level metadata transmission node device is not an upper-level control device that controls the metadata transmission node device 200, instead, in the metadata transmission channel (meta transmission channel), the metadata transmission node device that sends the to-be-forwarded data information is the upper-level metadata transmission node device, and the metadata transmission node device that receives the to-be-forwarded data information is the lower-level metadata transmission node device. The upper level and the lower level in the present disclosure are both determined relative to sending or receiving of the to-be-forwarded data information, which are different from the upper level and the lower level in the aspect of control function in the conventional techniques.

In an example embodiment of the present disclosure, the first forwarding unit 212 in a repeater in an actual region receives to-be-forwarded data information forwarded by an upper-level repeater, batches the to-be-forwarded data information, and sends the to-be-forwarded data information, in the form of batches, to a lower-level repeater between the actual regions.

In an example embodiment of the present disclosure, the second forwarding unit 214 in a repeater in an actual region judges, according to information configured in the repeater by a service of the actual region, whether the metadata client access device 100 corresponding to the repeater in the actual region requires the to-be-forwarded data information. For example, if the to-be-forwarded data information is data replication progress information of the client device A and the corresponding another client device C, data replication progress information of the corresponding another client device D, data replication progress information of the corresponding another client device E and the corresponding another client device F, and data type information of corresponding synchronous replication, and the metadata client access device 100 corresponding to the repeater in the actual region records the database data information of the source client device A replicated cross-regionally and synchronously, the second forwarding unit 214 in the repeater in the actual region forwards the to-be-forwarded data information to the corresponding metadata client access device 100.

Further, the first forwarding unit 212 is further configured to: send, when the corresponding lower-level metadata transmission node device fails, a second node device configuration request to a device equipped with a protocol for globally distributed consensus, to acquire an updated corresponding lower-level metadata transmission node device, and send the to-be-forwarded data information to the updated corresponding lower-level metadata transmission node device.

It should be noted that the device equipped with a protocol for globally distributed consensus (such as a global Paxos device) may include, but is not limited to, a device equipped with a protocol for globally distributed consensus (such as Paxos). The protocol for globally distributed consensus (such as Paxos) is a standard Paxos for performing synchronous automatic machine transformation between multiple machines, thus ensuring that the database data information can be recovered on another machine in the case that a small number of the machines fail. Certainly, those skilled in the art can understand that other existing or future possible device equipped with a protocol for globally distributed consensus, if applicable to the present disclosure, should also be included in the protection scope of the present disclosure, and incorporated herein by reference.

In an example embodiment of the present disclosure, when all the metadata transmission node devices are connected to each other with a ring structure, if the corresponding lower-level metadata transmission node device fails, the current metadata transmission node device sends a second node device configuration request to the device equipped with a protocol for globally distributed consensus (such as a global Paxos device), to acquire an updated corresponding lower-level metadata transmission node device, and send the to-be-forwarded data information to the updated corresponding lower-level metadata transmission node device.

For example, all the metadata transmission node devices in the metadata transmission channel (meta transmission channel) with the ring structure are a metadata transmission node device 1, a metadata transmission node device 200, a metadata transmission node device 3, a metadata transmission node device 4, and a metadata transmission node device 5, respectively. If the current metadata transmission node device is the metadata transmission node device 3, the corresponding lower-level metadata transmission node device thereof is the metadata transmission node device 4, and when the metadata transmission node device 4 fails, the current metadata transmission node device 3 sends a second node device configuration request to the device equipped with a protocol for globally distributed consensus (such as a global Paxos device), to acquire an updated corresponding lower-level metadata transmission node device, and send the to-be-forwarded data information to the updated corresponding lower-level metadata transmission node device.

Further, the metadata transmission node device is further configured to send a current node state to the device equipped with a protocol for globally distributed consensus periodically.

In an example embodiment of the present disclosure, all the metadata transmission node devices in the metadata transmission channel (meta transmission channel) with the ring structure may send a current node state to the device equipped with a protocol for globally distributed consensus (a global Paxos device) periodically, to enable the device equipped with a protocol for globally distributed consensus to timely send the updated corresponding metadata transmission node device to each metadata transmission node device in the meta transmission channel, so that the metadata transmission node device whose current node state is normal does not need to actively query the device equipped with a protocol for globally distributed consensus about a normal lower-level metadata transmission node device.

In another example embodiment of the present disclosure, the connection structure between all the metadata transmission node devices in the metadata transmission channel (meta transmission channel) may also be a topology structure capable of implementing data distribution between the metadata transmission node devices. For example, a multicast tree is constructed on each of the metadata transmission node devices to notify all the metadata transmission node devices; wherein a broadcast manner of each of the metadata transmission node devices may be direct point-to-point broadcast, and may also be a broadcast technical solution after optimization based on an asynchronous random algorithm (gossip), the law of random walk or the like; and a layer of repeater station is established between the metadata transmission node devices to make broadcast.

In another aspect of the present disclosure, a cross-regional data transmission system is provided, wherein the system includes: a metadata client access device, a metadata transmission node device, and a client device, wherein:

The metadata client access device includes one or more processor(s) or data processing unit(s) and memory, one or more input/output interface(s), and network interface(s). The memory is an example of computer readable media. The memory may store therein a plurality of modules or units including a first acquisition unit configured to acquire metadata information sent by a corresponding client device, and send the metadata information to a corresponding metadata transmission node device, wherein the metadata information includes data replication progress information of the corresponding client device; and a pushing unit configured to acquire to-be-forwarded data information sent by the corresponding metadata transmission node device, and push the to-be-forwarded data information to the corresponding client device, wherein the to-be-forwarded data information includes data replication progress information of another client device.

The metadata transmission node device includes one or more processor(s) or data processing unit(s) and memory, one or more input/output interface(s), and network interface(s). The memory is an example of computer readable media. The memory may store therein a plurality of modules or units including a first reception unit configured to receive metadata information of a corresponding client device sent by a corresponding metadata client access device, and send the metadata information to another metadata transmission node device, wherein the metadata information includes data replication progress information of the corresponding client device; a first forwarding unit configured to receive to-be-forwarded data information sent by a corresponding upper-level metadata transmission node device, process the to-be-forwarded data information and then send the processed to-be-forwarded data information to a corresponding lower-level metadata transmission node device, wherein the to-be-forwarded data information includes data replication progress information of another client device; and a second forwarding unit 214 configured to forward the to-be-forwarded data information relevant to the corresponding client device to the corresponding metadata client access device; and The client device includes one or more processor(s) or data processing unit(s) and memory, one or more input/output interface(s), and network interface(s). The memory is an example of computer readable media. The memory may store therein a plurality of modules or units including a third acquisition unit configured to acquire database data information sent by another client device through a data transmission channel; a sending unit configured to determine corresponding metadata information based on the database data information, wherein the metadata information includes data replication progress information of the corresponding client device, and send the metadata information to a corresponding metadata client access device; and a determination unit configured to receive to-be-forwarded data information pushed by the corresponding metadata client access device, wherein the to-be-forwarded data information includes data replication progress information of another corresponding client device, and determine, based on the to-be-forwarded data information, whether to continue to submit the corresponding database data information.

Figure 3:
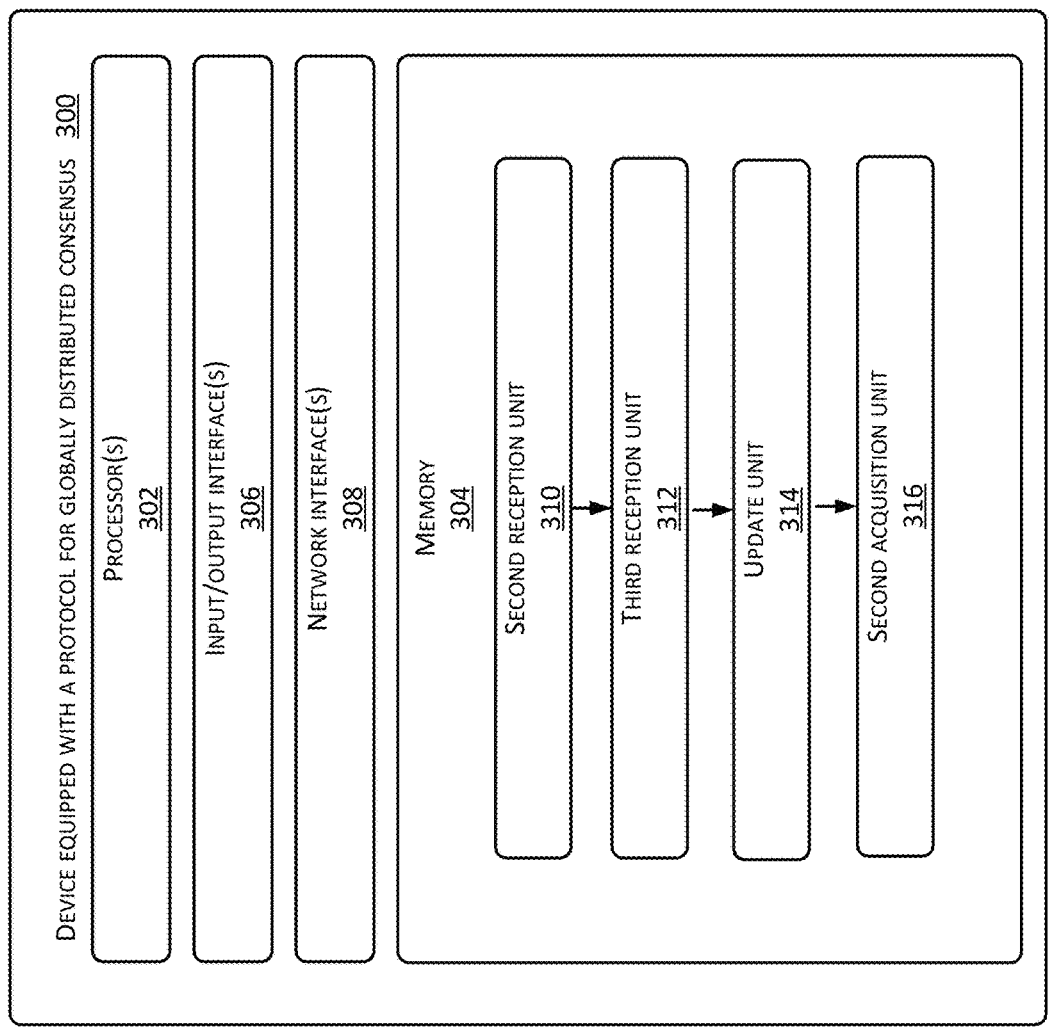
FIG. 3 is a schematic structural diagram of a device equipped with a protocol for globally distributed consensus for cross-regional data transmission according to an aspect of the present disclosure.

For example, the system may further include: a device equipped with a protocol for globally distributed consensus 300, as shown in FIG. 3, wherein the device equipped with a protocol for globally distributed consensus 300 includes one or more processor(s) 302 or data processing unit(s) and memory 304. The device equipped with a protocol for globally distributed consensus 300 may further include one or more input/output interface(s) 306, and network interface(s) 308. The memory 304 is an example of computer readable media.

The memory 304 may store therein a plurality of modules or units including a second reception unit 310, a third reception unit 312, an update unit 314, and a second acquisition unit 316.

Wherein the second reception unit 310 receives the first node device configuration request sent by the metadata client access device based on failure of the corresponding metadata transmission node device; the third reception unit 312 receives the second node device configuration request sent by the metadata transmission node device based on failure of a lower-level metadata transmission node device thereof; the update unit 314 updates the corresponding metadata transmission node device based on the first node device configuration request and/or the second node device configuration request; and the second acquisition unit 316 acquires the current node state sent by the metadata transmission node device periodically. In an example embodiment of the present disclosure, the second reception unit 310 in the device equipped with a protocol for globally distributed consensus 3 (such as a global Paxos device) receives a first node device configuration request sent by the metadata client access device 100 based on failure of the metadata transmission node device 200. For example, when the metadata transmission node device 200 corresponding to the metadata client access device 100 fails, the second reception unit 310 receives a first node device configuration request sent by the metadata client access device 100 when the metadata transmission node device 200 corresponding thereto fails. The third reception unit 312 in the device equipped with a protocol for globally distributed consensus 300 receives a second node device configuration request sent by the metadata transmission node device based on failure of a lower-level metadata transmission node device thereof. For example, when a lower-level metadata transmission node device corresponding to the current metadata transmission node device 200 in the metadata transmission channel (meta transmission channel) fails, the third reception unit 312 receives a second node device configuration request sent by the current metadata transmission node device 200. The update unit 314 in the device equipped with a protocol for globally distributed consensus 300 updates the corresponding metadata transmission node device based on the first node device configuration request and/or the second node device configuration request. For example, the update unit 314 updates, based on the first node device configuration request and/or the second node device configuration request, the corresponding metadata transmission node device 200 in the metadata transmission channel (meta transmission channel). The second acquisition unit 316 in the device equipped with a protocol for globally distributed consensus 3 acquires the current node state sent by the metadata transmission node device periodically. For example, the second acquisition unit 316 in the device equipped with a protocol for globally distributed consensus 3 may acquire a current node state sent by all the metadata transmission node devices 2 in the metadata transmission channel (meta transmission channel) periodically, to enable the device equipped with a protocol for globally distributed consensus 300 to timely send the updated corresponding metadata transmission node device to each of the metadata transmission node devices in the meta transmission channel, so that the metadata transmission node device whose current node state is normal does not need to actively query the device equipped with a protocol for globally distributed consensus about a normal lower-level metadata transmission node device.

In an example embodiment of the present disclosure, the first acquisition unit 110 in the system is further configured to: send, when the corresponding metadata transmission node device fails, a first node device configuration request to a device equipped with a protocol for globally distributed consensus, to acquire an updated corresponding metadata transmission node device, and send the metadata information to the updated metadata transmission node device; the first forwarding unit 212 is further configured to: send, when the corresponding lower-level metadata transmission node device fails, a second node device configuration request to a device equipped with a protocol for globally distributed consensus, to acquire an updated corresponding lower-level metadata transmission node device; and the metadata transmission node device 200 is further configured to: send a current node state to the device equipped with a protocol for globally distributed consensus periodically.

Figure 4:
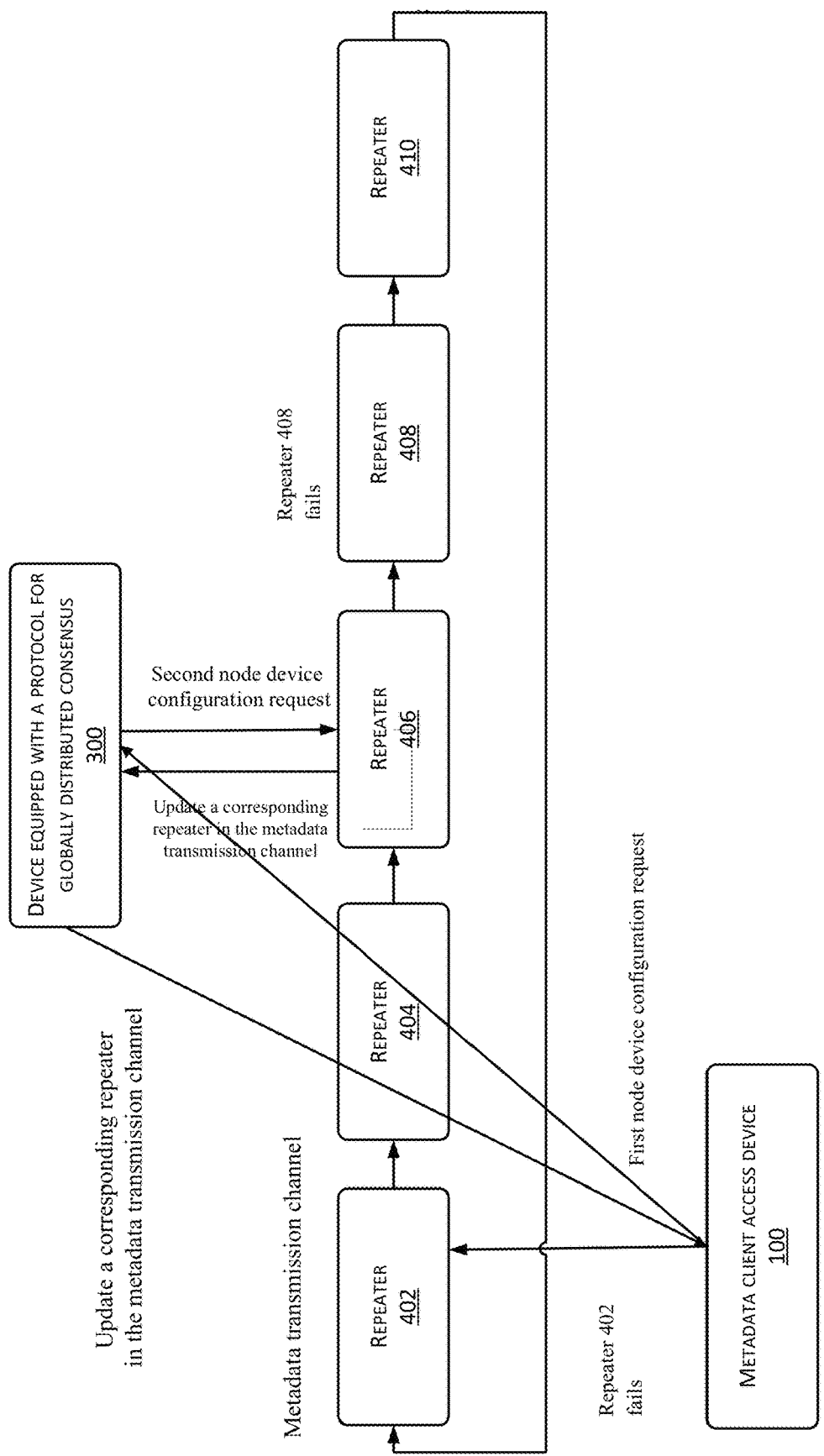
FIG. 4 is a schematic structural diagram of configuration of a metadata transmission node device for cross-regional data transmission according to an aspect of the present disclosure.

FIG. 4 is a schematic structural diagram of configuration of a metadata transmission node device for cross-regional data transmission according to an aspect of the present disclosure. In an example embodiment of the present disclosure, if all the repeaters (i.e., metadata transmission node devices) in the metadata transmission channel (meta transmission channel) with the ring structure are a repeater 402, a repeater 404, a repeater 406, a repeater 408, and a repeater 410 respectively, when the repeater 402 corresponding to the metadata client access device (meta client access layer) 100 fails, the metadata client access device 100 sends a first node device configuration request to the device equipped with a protocol for globally distributed consensus 300 (such as a global Paxos device). The update unit 314 in the device equipped with a protocol for globally distributed consensus 300 deletes, based on the first node device configuration request, the repeater 402 corresponding to the failure state from the meta transmission channel, adds a repeater whose current node state is a healthy state, and timely updates the corresponding repeater in the meta transmission channel, so that the current repeater does not need to query the device equipped with a protocol for globally distributed consensus 300 about a lower-level repeater; and/or when the repeater 406 forwards the to-be-forwarded data information, if the lower-level repeater 408 of the repeater 406 fails, the repeater 406 sends a second node device configuration request to the device equipped with a protocol for globally distributed consensus 300. The update unit 314 in the device equipped with a protocol for globally distributed consensus 300 deletes, based on the second node device configuration request, the repeater 408 corresponding to the failure state from the meta transmission channel, adds another repeater whose current node state is a healthy state, and timely updates the corresponding repeater in the meta transmission channel, so that the current repeater does not need to query the device equipped with a protocol for globally distributed consensus about a lower-level repeater.

Figure 5:
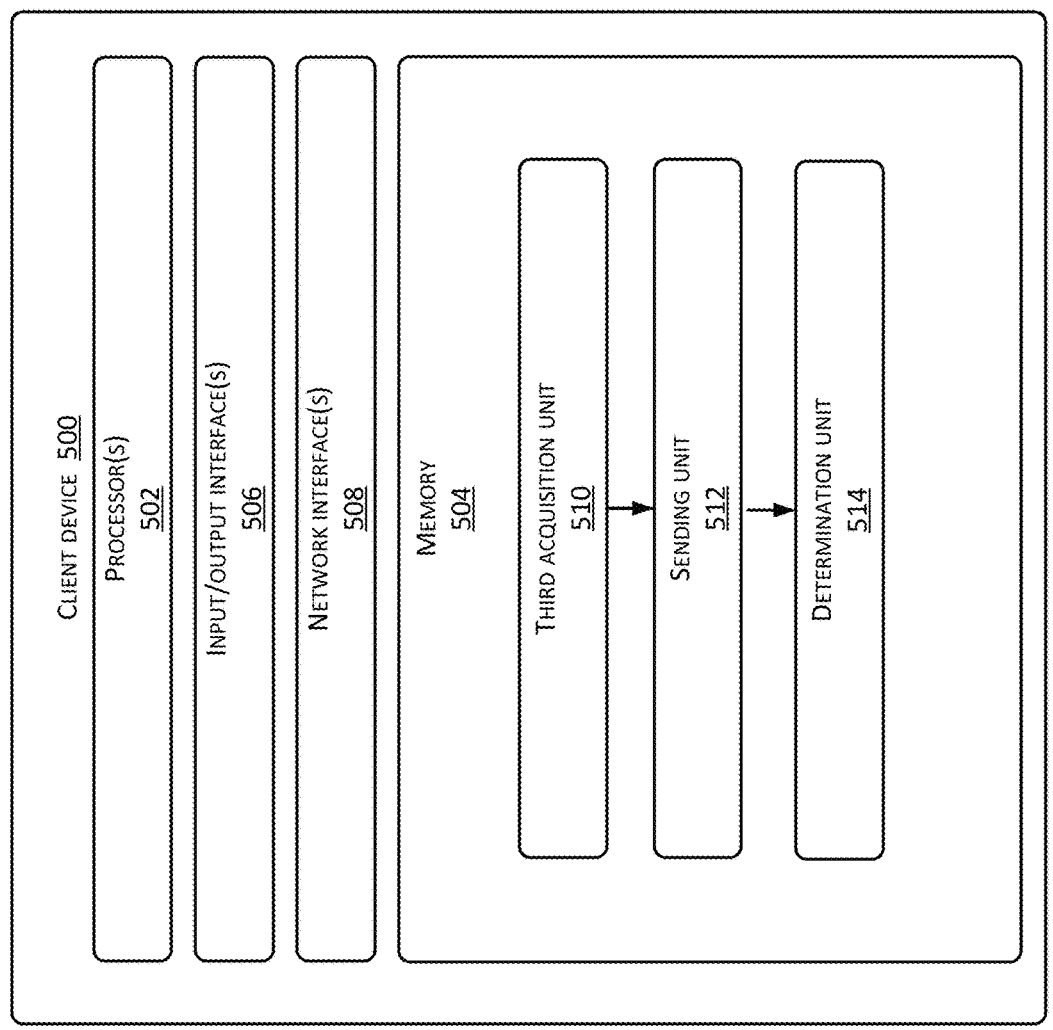
FIG. 5 is a schematic structural diagram of a client device for cross-regional data transmission according to an aspect of the present disclosure.

FIG. 5 is a schematic structural diagram of a client device 500 for cross-regional data transmission according to an aspect of the present disclosure. The client device 500 includes one or more processor(s) 502 or data processing unit(s) and memory 504. The client device 500 may further include one or more input/output interface(s) 506, and network interface(s) 508. The memory 504 is an example of computer readable media.

The memory 504 may store therein a plurality of modules or units including a third acquisition unit 510, a sending unit 512, and a determination unit 514.

Wherein the third acquisition unit 510 acquires database data information sent by another client device through a data transmission channel; the sending unit 512 determines corresponding metadata information based on the database data information, wherein the metadata information includes data replication progress information of the corresponding client device, and sends the metadata information to a corresponding metadata client access device; and the determination unit 514 receives to-be-forwarded data information pushed by the corresponding metadata client access device, wherein the to-be-forwarded data information includes data replication progress information of another corresponding client device, and determines, based on the to-be-forwarded data information, whether to continue to submit the corresponding database data information.

It should be noted that the client device 500 may include, but not limited to, a client terminal library or a device formed by a network device integrated through a network. The network device includes an electronic device capable of automatically performing numerical calculation and information processing according to a preset or pre-stored instruction, and hardware thereof includes, but is not limited to, a microprocessor, an application specific integrated circuit (ASIC), a field programmable gate array (FPGA), a digital signal processor (DSP), an embedded device, and the like. The network includes, but is not limited to, the Internet, a wide area network, a metropolitan area network, a local area network, a VPN network, a wireless Ad Hoc network, and the like. For example, the client terminal library may also be a script program run on a device that is formed by the user equipment integrated with the network device through the network, and may be implemented in any language. Certainly, those skilled in the art should understand that the client device 500 is merely an example, and other existing or future possible client devices 4, if applicable to the present disclosure, should also be included in the protection scope of the present disclosure, and be incorporated herein by reference.

In an example embodiment of the present disclosure, the third acquisition unit 510 in the client device 500 (client terminal library A) acquires database data information sent by another client terminal library B through a data transmission channel, the sending unit 512 in the client terminal library A determines corresponding metadata information based on the database data information, wherein the metadata information includes data replication progress information of the corresponding client device, that is, database data information that needs to be transmitted between the client terminal library A and the client terminal library B is 10 minutes, wherein the database data information in the client terminal library B acquired by the client terminal library A is 6 minutes, and thus the corresponding metadata information is determined based on the database data information, wherein the metadata information is data replication progress information (i.e., 6 minutes/10 minutes=60%) of the client terminal library B, and the sending unit 512 in the client terminal library A sends the metadata information to the corresponding metadata client access device 100.

In the above example embodiment of the present disclosure, the determination unit 514 in the client device 500 receives to-be-forwarded data information pushed by the corresponding metadata client access device 100 (meta client access layer), wherein the to-be-forwarded data information includes data replication progress information of another corresponding client device. For example, another corresponding client device C replicates database data information of the source client device A cross-regionally and synchronously, wherein the database data information of the source client device A that needs to be replicated cross-regionally and synchronously is 15 minutes, and the database data information of the source client device A replicated by the another corresponding client device C cross-regionally and synchronously is 10 minutes, the to-be-forwarded data information received by the determination unit 514 includes data replication progress information, of the source client device A and the another corresponding client device C corresponding thereto, which is 10 minutes; and the determination unit 514 in the client device 500 determines, based on the to-be-forwarded data information, whether to continue to submit the corresponding database data information.

Further, the determination unit 514 is configured to: determine, based on the to-be-forwarded data information, a real-time recovery point objective corresponding to to-be-submitted database data information; acquire a recovery point objective index, and determine, based on the real-time recovery point objective and the recovery point objective index, whether to continue to submit the corresponding database data information.

It should be noted that the recovery point objective (RPO) refers to the age of a file that has to be recovered from a backup storage to ensure normal operation of the system when a computer, system or network fails due to failure of hardware, a program or communication. The recovery point objective is indicated backwards (i.e., to the past) from the beginning of the failure, and it can be indicated with second, minute, hour or day.

In the above example embodiment of the present disclosure, the determination unit 514 determines, based on the to-be-forwarded data information, that is, data replication progress information of the source client device A and the another corresponding client device C corresponding thereto is 10 minutes and the database data information of the source client device A that needs to be replicated cross-regionally and synchronously is 15 minutes, that a real-time recovery point objective RPO corresponding to to-be-submitted database data information is 15 minutes−10 minutes=5 minutes; acquires a recovery point objective index, and determines, based on the real-time recovery point objective and the recovery point objective index, whether to continue to submit the corresponding database data information.

Further, the determination unit 514 is configured to: continue to submit the to-be-submitted database data information if the recovery point objective index is higher than or equal to the real-time recovery point objective; or stop submitting the corresponding to-be-submitted database data information higher than the recovery point objective index if the recovery point objective index is lower than the real-time recovery point objective.

In the above example embodiment of the present disclosure, if the acquired recovery point objective RPO index is 6 minutes, the recovery point objective index which is 6 minutes is higher than the real-time recovery point objective corresponding to the to-be-submitted database data information which is 5 minutes, and the determination unit 514 continues to submit the to-be-submitted database data information; if the acquired recovery point objective index is 3 minutes, the recovery point objective index which is 3 minutes is lower than the real-time recovery point objective corresponding to the to-be-submitted database data information which is 5 minutes, that is, it can be seen according to the real-time recovery point objective that there are still 5-minute database data information to be submitted, but the recovery point objective RPO index is 3 minutes, the database data information corresponding to the real-time recovery point objective which is 5 minutes cannot be completely submitted, and submission of corresponding to-be-submitted database data information higher than the recovery point objective RPO index which is 3 minutes is stopped, for ensuring the recovery point objective RPO index.

Figure 6:
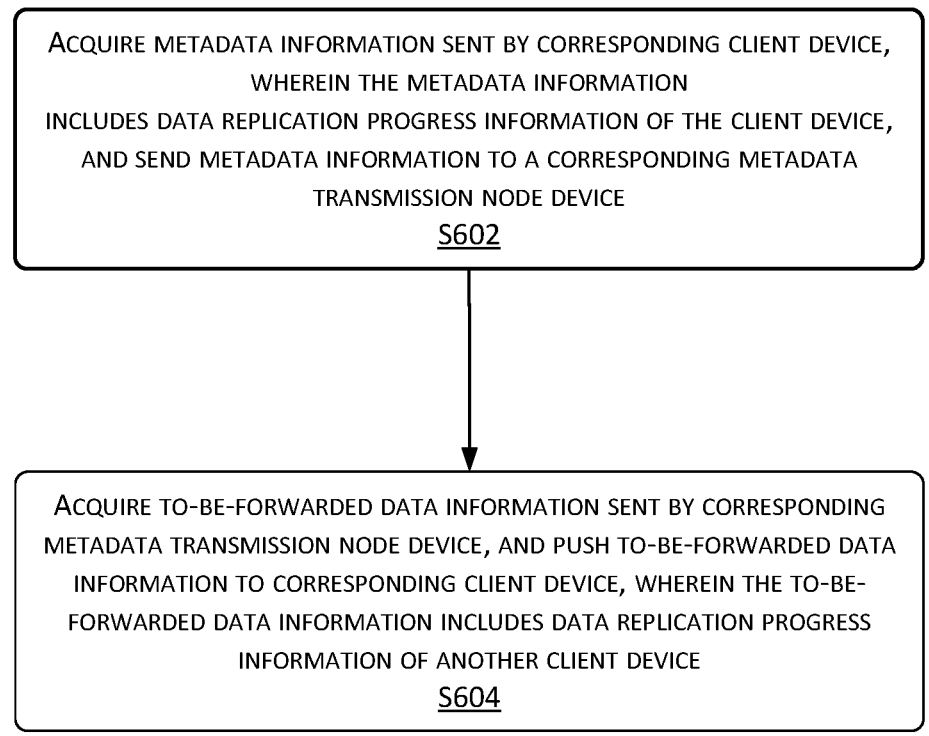
FIG. 6 is a schematic flow chart of a cross-regional data transmission method at a metadata client access device terminal according to another aspect of the present disclosure.

FIG. 6 is a schematic flow chart of a cross-regional data transmission method at a metadata client access device terminal according to another aspect of the present disclosure. The method includes step S602 and step S604.

Wherein in the step S602, metadata information sent by a corresponding client device is acquired, and the metadata information is sent to a corresponding metadata transmission node device, wherein the metadata information includes data replication progress information of the corresponding client device; and in the step S604, to-be-forwarded data information sent by the corresponding metadata transmission node device is acquired, and the to-be-forwarded data information is pushed to the corresponding client device, wherein the to-be-forwarded data information includes data replication progress information of another client device.

In an example embodiment of the present disclosure, the metadata client access device (meta client access layer) is an interface device for carrying out a data transmission service between the client device and the metadata transmission node device.

In an example embodiment of the present disclosure, the metadata information includes data replication progress information of the corresponding client device, wherein the metadata information includes at least one of the following: a device ID of the corresponding client device, data replication progress information of the corresponding client device, and a device ID of a source client device corresponding to the data. Certainly, those skilled in the art should understand that the metadata information is merely an example, and other existing or future possible metadata information, if applicable to the present disclosure, should also be included in the protection scope of the present disclosure, and incorporated herein by reference.

For example, a source client device A replicates database data information into a corresponding client device B cross-regionally and synchronously, the corresponding client device B may notify a metadata client access device corresponding thereto in the form of metadata information, the metadata information acquired in the step S602 includes data replication progress information of the corresponding client device B, the source client device A corresponding to the data synchronously replicated, and synchronous replication thereof in the corresponding client device B, and the metadata information is sent to the corresponding metadata transmission node device.

In an example embodiment of the present disclosure, the to-be-forwarded data information includes data replication progress information of another client device. Wherein the to-be-forwarded data information includes data replication progress information of another client device and data type information of corresponding synchronous replication thereof, that is, the to-be-forwarded data information includes metadata information corresponding to the other client device and data type information of corresponding synchronous replication thereof. Then, the to-be-forwarded data information includes at least one of the following: a device ID of the other client device, data replication progress information of the another client device, a device ID of a source client device corresponding to the data, and data type information of corresponding synchronous replication. Certainly, those skilled in the art should understand that the metadata information is merely an example, and other existing or future possible metadata information, if applicable to the present disclosure, should also be included in the protection scope of the present disclosure, and incorporated herein by reference.

For example, a client device C, a client device D, a client device E, and a client device F replicate the database data information of the source client device A cross-regionally and synchronously, respectively, and the to-be-forwarded data information includes data replication progress information of the source client device A and the another client device C corresponding thereto, data replication progress information of the another client device D corresponding thereto, data replication progress information of the corresponding another client device E and the corresponding another client device F, and data type information of corresponding synchronous replication; if the client device corresponding to the step S604 acquires and processes data information relevant to data in the to-be-forwarded data information synchronously replicated into the client device D, in the step S604, replication progress information of the client device D in the to-be-forwarded data information is pushed to the corresponding client device of the metadata client access device.

Further, the step S602 further includes: performing persistence processing on the metadata information, and then sending persistence acknowledgement information to the corresponding client device.

It should be noted that, in the step S602 of the present disclosure, persistence processing may be performed on the metadata information by, but not limited to, a Paxos group. In an example embodiment of the present disclosure, the persistence processing is performed on the metadata information by the Paxos group. Certainly, those skilled in the art should understand that the performing persistence processing on the metadata information by the Paxos group is merely an example embodiment of the present disclosure, and other existing or future possible manners capable of performing persistence processing on the metadata information, if applicable to the present disclosure, should also be included in the protection scope of the present disclosure, and incorporated herein by reference.

For example, in the step S602, persistence processing is performed on the metadata information by a Paxos group, and after the metadata information is written into a Paxos ring, persistence acknowledgement information is sent to the corresponding client device, to make the client device, upon receipt of the persistence acknowledgement information, acknowledge that the metadata information is persisted.

Further, the step S602 includes: sending, when the corresponding metadata transmission node device fails, a first node device configuration request to a device equipped with a protocol for globally distributed consensus, to acquire an updated corresponding metadata transmission node device, and sending the metadata information to the updated metadata transmission node device.

In the example embodiment of the present disclosure, the first node device configuration request is, in the case that the corresponding metadata transmission node device fails, sent to a device equipped with a protocol for globally distributed consensus through the step S602, to acquire an updated corresponding metadata transmission node device, and in the step S602, the metadata information is sent to the updated metadata transmission node device.

Figure 7:
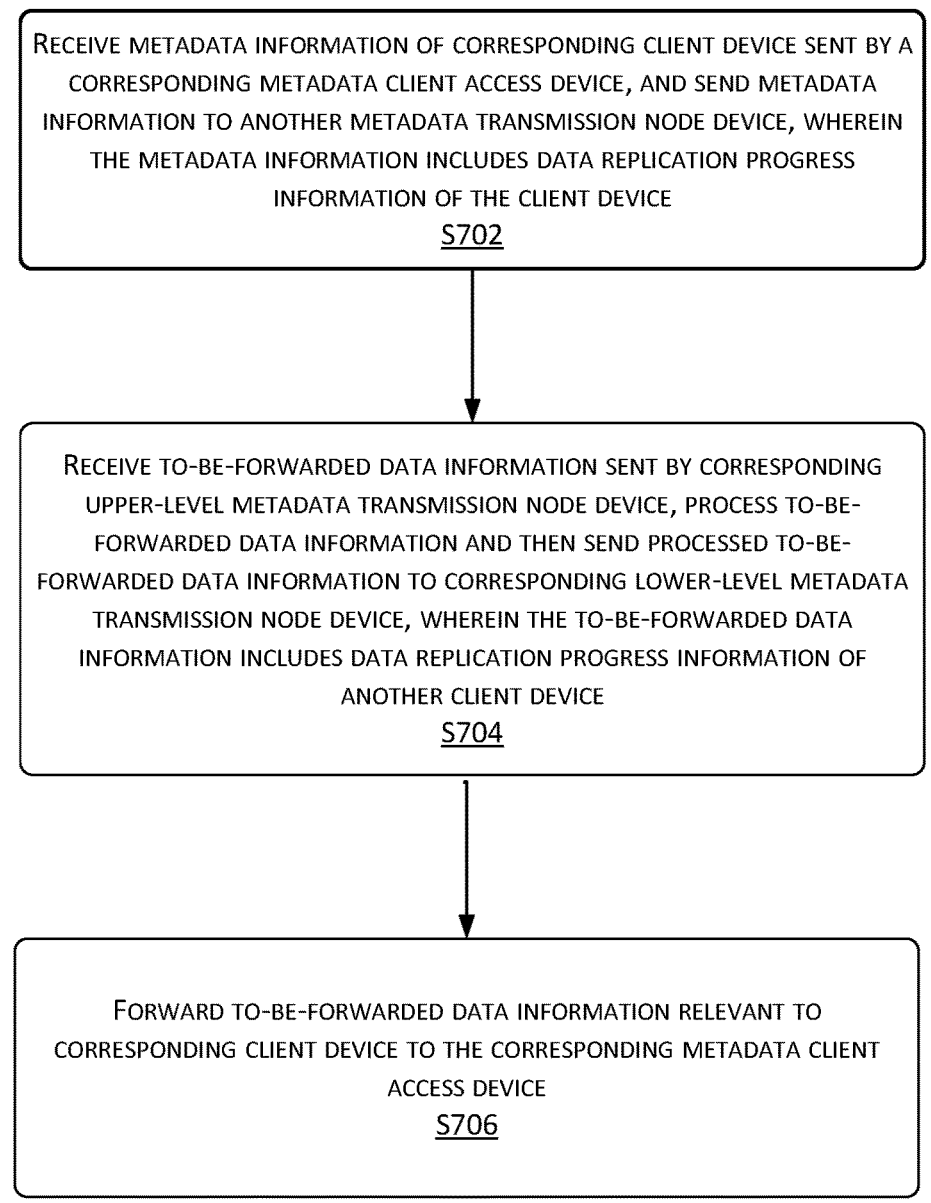
FIG. 7 is a schematic flow chart of a cross-regional data transmission method at a metadata transmission node device terminal according to another aspect of the present disclosure.

FIG. 7 is a schematic flow chart of a cross-regional data transmission method at a metadata transmission node device terminal according to another aspect of the present disclosure. The method includes step S702, step S704, and step S706.

Wherein in the step S702, metadata information of a corresponding client device sent by a corresponding metadata client access device is received, and the metadata information is sent to another metadata transmission node device, wherein the metadata information includes data replication progress information of the corresponding client device; in the step S704, to-be-forwarded data information sent by a corresponding upper-level metadata transmission node device is received, the to-be-forwarded data information is processed and then sent to a corresponding lower-level metadata transmission node device, wherein the to-be-forwarded data information includes data replication progress information of another client device; and in the step S706, the to-be-forwarded data information relevant to the corresponding client device is forwarded to the corresponding metadata client access device.

It should be noted that there are two or more metadata transmission node devices, which are distributed in different regions. A connection structure between all the metadata transmission node devices may include, but not limited to, a ring structure and a topology structure. In an example embodiment of the present disclosure, the ring structure is the connection structure between all the metadata transmission node devices. Certainly, those skilled in the art should understand that the ring structure is merely an example embodiment of the connection structure between all the metadata transmission node devices, and other existing or future possible metadata transmission node devices, if applicable to the present disclosure, should also be included in the protection scope of the present disclosure, and incorporated herein by reference.

It should be noted that the metadata transmission node device may include, but not limited to, a node switch, a wireless network node device, and a repeater. In an example embodiment of the present disclosure, the repeater is the metadata transmission node device. Certainly, those skilled in the art should understand that the repeater is merely an example embodiment of the metadata transmission node device, and other existing or future possible metadata transmission node devices, if applicable to the present disclosure, should also be included in the protection scope of the present disclosure, and incorporated herein by reference.

In an example embodiment of the present disclosure, all the repeaters are deployed in various regions respectively, and jointly form a metadata transmission channel (meta transmission channel) with a ring structure. In the meta transmission channel, in the step S702, metadata information about data synchronous replication performed in various regions sent from the corresponding metadata client access device is received, and the metadata information is added to a batch to be sent next time, to send the metadata information to another metadata transmission node device.

It should be noted that, in the step S704, the upper-level metadata transmission node device is not an upper-level control device that controls the metadata transmission node device, instead, in the metadata transmission channel (meta transmission channel), the metadata transmission node device that sends the to-be-forwarded data information is the upper-level metadata transmission node device, and the metadata transmission node device that receives the to-be-forwarded data information is the lower-level metadata transmission node device. The upper level and the lower level in the present disclosure are both determined relative to sending or receiving of the to-be-forwarded data information, which are different from the upper level and the lower level in the aspect of control function in the conventional techniques.

In an example embodiment of the present disclosure, in the step S704, to-be-forwarded data information forwarded by an upper-level repeater is received, the to-be-forwarded data information is batched, and the to-be-forwarded data information is sent, in the form of batches, to a lower-level repeater between the actual regions.

In an example embodiment of the present disclosure, in the step S706, whether the metadata client access device corresponding to the repeater in the actual region requires the to-be-forwarded data information is judged according to information configured in the repeater by a service of the actual region. For example, if the to-be-forwarded data information is data replication progress information of the client device A and the corresponding another client device C, data replication progress information of the corresponding another client device D, data replication progress information of the corresponding another client device E and the corresponding another client device F, and data type information of corresponding synchronous replication and the metadata client access device corresponding to the repeater in the actual region records the database data information of the source client device A replicated cross-regionally and synchronously, in the step S706, the to-be-forwarded data information is forwarded to the corresponding metadata client access device.

Further, the step S704 further includes: sending, when the corresponding lower-level metadata transmission node device fails, a second node device configuration request to a device equipped with a protocol for globally distributed consensus, to acquire an updated corresponding lower-level metadata transmission node device, and sending the to-be-forwarded data information to the updated corresponding lower-level metadata transmission node device.

It should be noted that the device equipped with a protocol for globally distributed consensus (such as a global Paxos device) may include, but not limited to, a device equipped with a protocol for globally distributed consensus containing a Paxos. For example, the protocol for globally distributed consensus is a standard distributive, used to perform synchronous automatic machine transformation between multiple machines, thus ensuring that the database data information can be recovered on another machine in the case that a small number of the machines fail. Certainly, those skilled in the art can understand that other existing or future possible device equipped with a protocol for globally distributed consensuss, if applicable to the present disclosure, should also be included in the protection scope of the present disclosure, and incorporated herein by reference.

In an example embodiment of the present disclosure, when all the metadata transmission node devices are connected to each other with a ring structure, if the corresponding lower-level metadata transmission node device fails, a second node device configuration request is sent to the device equipped with a protocol for globally distributed consensus (such as a global Paxos device) through the step S704, to acquire an updated corresponding lower-level metadata transmission node device, and the to-be-forwarded data information is sent to the updated corresponding lower-level metadata transmission node device.

For example, all the metadata transmission node devices in the metadata transmission channel (meta transmission channel) with the ring structure are a first metadata transmission node device, a second metadata transmission node device, a third metadata transmission node device, a fourth metadata transmission node device, and a fifth metadata transmission node device, respectively. If the current metadata transmission node device is the third metadata transmission node device, the corresponding lower-level metadata transmission node device thereof is the fourth metadata transmission node device, and when the fourth metadata transmission node device fails, in step S704, the current metadata transmission node device sends a second node device configuration request to the device equipped with a protocol for globally distributed consensus (such as a global Paxos device), to acquire an updated corresponding lower-level metadata transmission node device, and send the to-be-forwarded data information to the updated corresponding lower-level metadata transmission node device.

Further, the method further includes another step (not shown in FIG. 7): sending a current node state to the device equipped with a protocol for globally distributed consensus periodically.

In the example embodiment of the present disclosure, the another step includes: sending, by all the metadata transmission node devices in the metadata transmission channel (meta transmission channel) with the ring structure, a current node state to the device equipped with a protocol for globally distributed consensus (such as a global Paxos device) periodically, to enable the device equipped with a protocol for globally distributed consensus to timely send the updated corresponding metadata transmission node device to each metadata transmission node device in the metadata transmission channel, so that the metadata transmission node device whose current node state is normal does not need to actively query the device equipped with a protocol for globally distributed consensus about a normal lower-level metadata transmission node device.

Figure 8:
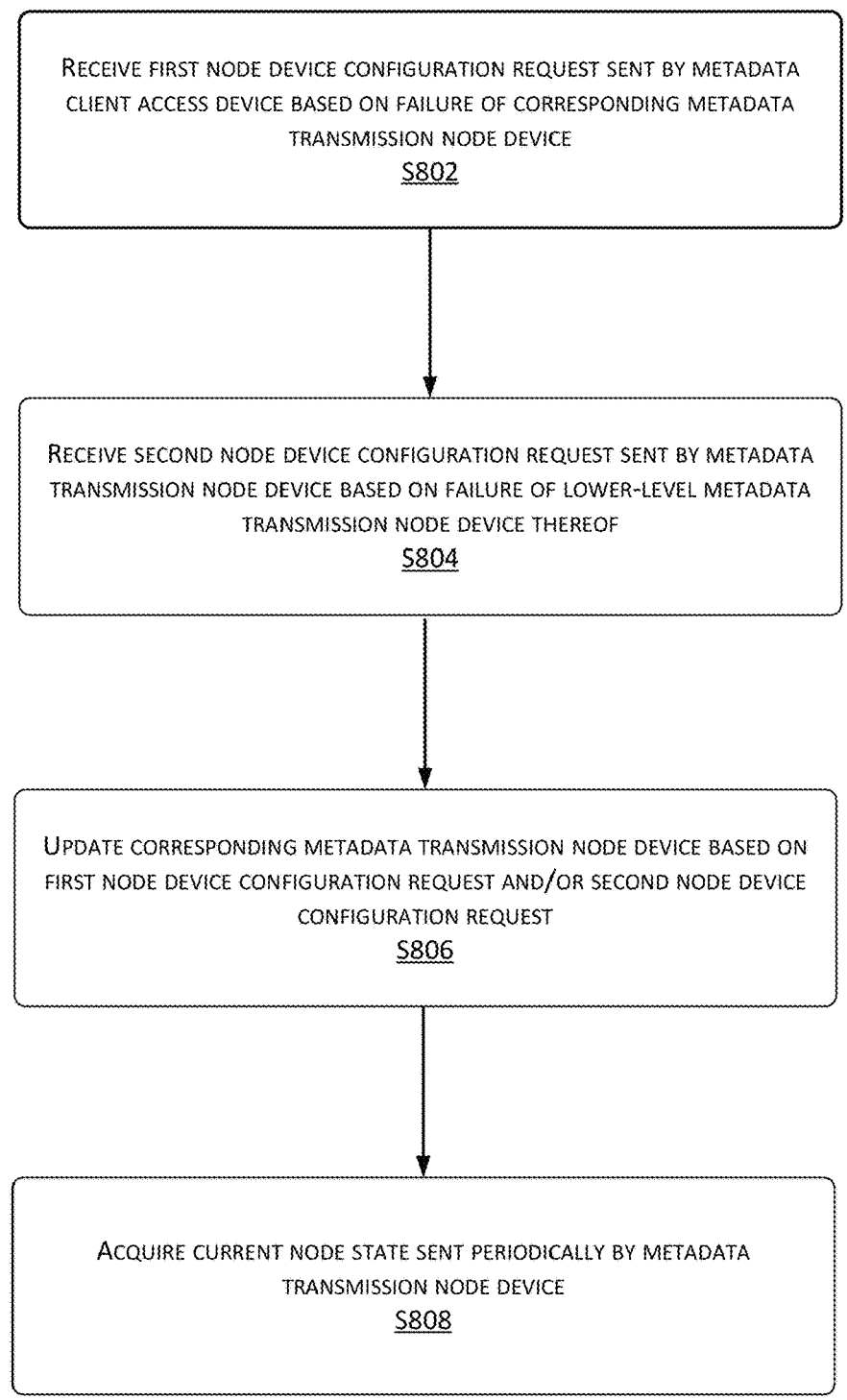
FIG. 8 is a schematic flow chart of a cross-regional data transmission method at a device equipped with a protocol for globally distributed consensus terminal according to another aspect of the present disclosure.

FIG. 8 is a schematic flow chart of a cross-regional data transmission method at a device equipped with a protocol for globally distributed consensus terminal according to another aspect of the present disclosure. The method includes step S802, step S804, step S806 and step S808.

Wherein, in the step S802, a first node device configuration request sent by the metadata client access device based on failure of the corresponding metadata transmission node device is received; in the step S804, a second node device configuration request sent by the metadata transmission node device based on failure of a lower-level metadata transmission node device thereof is received; in the step S806, the corresponding metadata transmission node device is updated based on the first node device configuration request and/or the second node device configuration request; and in the step S808, the current node state sent periodically by the metadata transmission node device is acquired.

In an example embodiment of the present disclosure, in the step S802, a first node device configuration request sent by the metadata client access device based on failure of the corresponding metadata transmission node device is received. For example, when the metadata transmission node device corresponding to the metadata client access device fails, in the step S802, a first node device configuration request sent by the metadata client access device when the metadata transmission node device corresponding thereto fails is received. In the step S804, a second node device configuration request sent by the metadata transmission node device based on failure of a lower-level metadata transmission node device thereof is received. For example, when a lower-level metadata transmission node device corresponding to the current metadata transmission node device in the metadata transmission channel (meta transmission channel) fails, in the step S804, a second node device configuration request sent by the current metadata transmission node device is received. In the step S806, the corresponding metadata transmission node device is updated based on the first node device configuration request and/or the second node device configuration request. For example, in the step S806, the corresponding metadata transmission node device in the metadata transmission channel (meta transmission channel) is updated based on the first node device configuration request and/or the second node device configuration request. In the step S808, the current node state sent periodically by the metadata transmission node device is acquired. For example, in the step S808, a current node state sent periodically by all the metadata transmission node devices in the metadata transmission channel (meta transmission channel) may be acquired, to enable the device equipped with a protocol for globally distributed consensus to timely send the updated corresponding metadata transmission node device to each of the metadata transmission node devices in the meta transmission channel, so that the metadata transmission node device whose current node state is normal does not need to actively query the device equipped with a protocol for globally distributed consensus about a normal lower-level metadata transmission node device.

Figure 9:
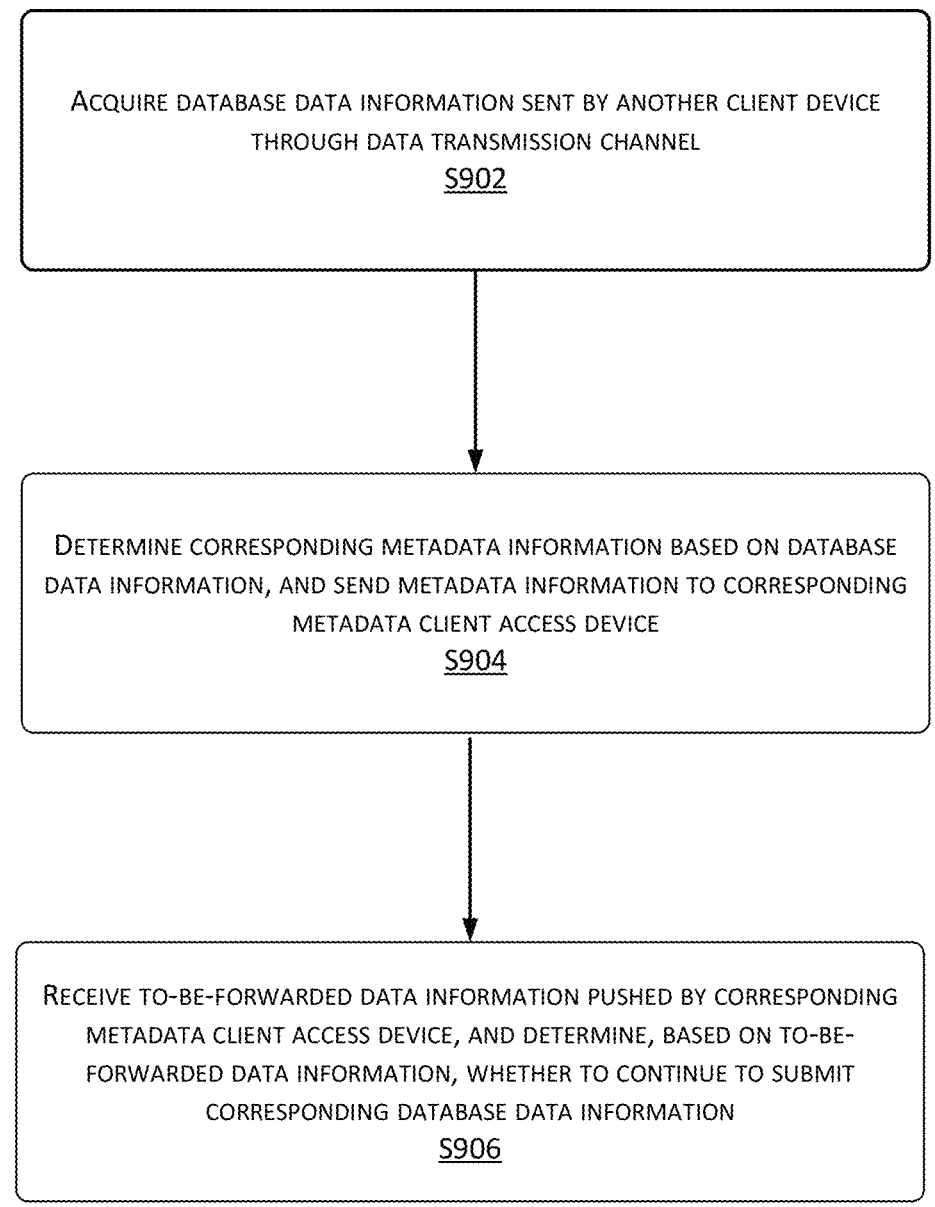
FIG. 9 is a schematic flow chart of a cross-regional data transmission method at a client device terminal according to another aspect of the present disclosure.

FIG. 9 is a schematic flow chart of a cross-regional data transmission method at a client device terminal according to another aspect of the present disclosure. The method includes step S902, step S904, and step S906.

Wherein, in the step S902, database data information sent by another client device through a data transmission channel is acquired; in the step S904, corresponding metadata information is determined based on the database data information, wherein the metadata information includes data replication progress information of the corresponding client device, and the metadata information is sent to a corresponding metadata client access device; and in the step S906, to-be-forwarded data information pushed by the corresponding metadata client access device is received, wherein the to-be-forwarded data information includes data replication progress information of another corresponding client device, and whether to continue to submit the corresponding database data information is determined based on the to-be-forwarded data information.

In an example embodiment of the present disclosure, in the step S902, database data information sent by another client terminal library B through a data transmission channel is acquired, in the step S904, corresponding metadata information is determined based on the database data information, wherein the metadata information includes data replication progress information of the corresponding client device. For example, database data information that needs to be transmitted between the client terminal library A and the client terminal library B is 10 minutes, wherein the database data information in the client terminal library B acquired by the client terminal library A is 6 minutes, and thus the corresponding metadata information is determined based on the database data information, wherein the metadata information is data replication progress information (i.e., 6 minutes/10 minutes=60%) of the client terminal library B, and in the step S904, the metadata information is sent to the corresponding metadata client access device.

In the above example embodiment of the present disclosure, in the step S906, to-be-forwarded data information pushed by the corresponding metadata client access device (meta client access layer) is received, wherein the to-be-forwarded data information includes data replication progress information of another corresponding client device. For example, another corresponding client device C replicates database data information of the source client device A cross-regionally and synchronously, wherein the database data information of the source client device A that needs to be replicated cross-regionally and synchronously is 15 minutes, and the database data information of the source client device A replicated by the another corresponding client device C cross-regionally and synchronously is 10 minutes, the to-be-forwarded data information received in the step S906 includes data replication progress information, of the source client device A and the another corresponding client device C corresponding thereto, which is 10 minutes; and in the step S906, whether to continue to submit the corresponding database data information is determined based on the to-be-forwarded data information.

Further, the step S906 includes: determining, based on the to-be-forwarded data information, a real-time recovery point objective corresponding to to-be-submitted database data information; acquiring a recovery point objective index, and determining, based on the real-time recovery point objective and the recovery point objective index, whether to continue to submit the corresponding database data information.

It should be noted that the recovery point objective (RPO) refers to the age of a file that has to be recovered from a backup storage to ensure normal operation of the system when a computer, system or network fails due to failure of hardware, a program or communication. The recovery point objective is indicated backwards from the beginning of the failure (i.e., to the past), and it can be indicated with second, minute, hour or day.

In the above example embodiment of the present disclosure, in the step S906, based on the to-be-forwarded data information, that is, data replication progress information of the source client device A and the another corresponding client device C corresponding thereto is 10 minutes and the database data information of the source client device A that needs to be replicated cross-regionally and synchronously is 15 minutes, that a real-time RPO corresponding to to-be-submitted database data information is 15 minutes−10 minutes=5 minutes; in the step S906, a recovery point objective index is acquired, and whether to continue to submit the corresponding database data information is determined based on the real-time recovery point objective and the recovery point objective index.

Further, the step S906 includes: continuing to submit the to-be-submitted database data information if the recovery point objective index is higher than or equal to the real-time recovery point objective; or stopping submitting the corresponding to-be-submitted database data information higher than the recovery point objective index if the recovery point objective index is lower than the real-time recovery point objective.

In the above example embodiment of the present disclosure, if the acquired recovery point objective RPO index is 6 minutes, the recovery point objective index which is 6 minutes is higher than the real-time recovery point objective corresponding to the to-be-submitted database data information which is 5 minutes, and the to-be-submitted database data information continues to be submitted in the step S906; if the acquired recovery point objective index is 3 minutes, the recovery point objective index which is 3 minutes is lower than the real-time recovery point objective corresponding to the to-be-submitted database data information which is 5 minutes, that is, it can be seen according to the real-time recovery point objective that there are still 5-minute database data information to be submitted, but the recovery point objective RPO index is 3 minutes, the database data information corresponding to the real-time recovery point objective which is 5 minutes cannot be completely submitted, and in the step S906, submission of corresponding to-be-submitted database data information higher than the recovery point objective RPO index which is 3 minutes is stopped, for ensuring the recovery point objective RPO index.

Figure 10:
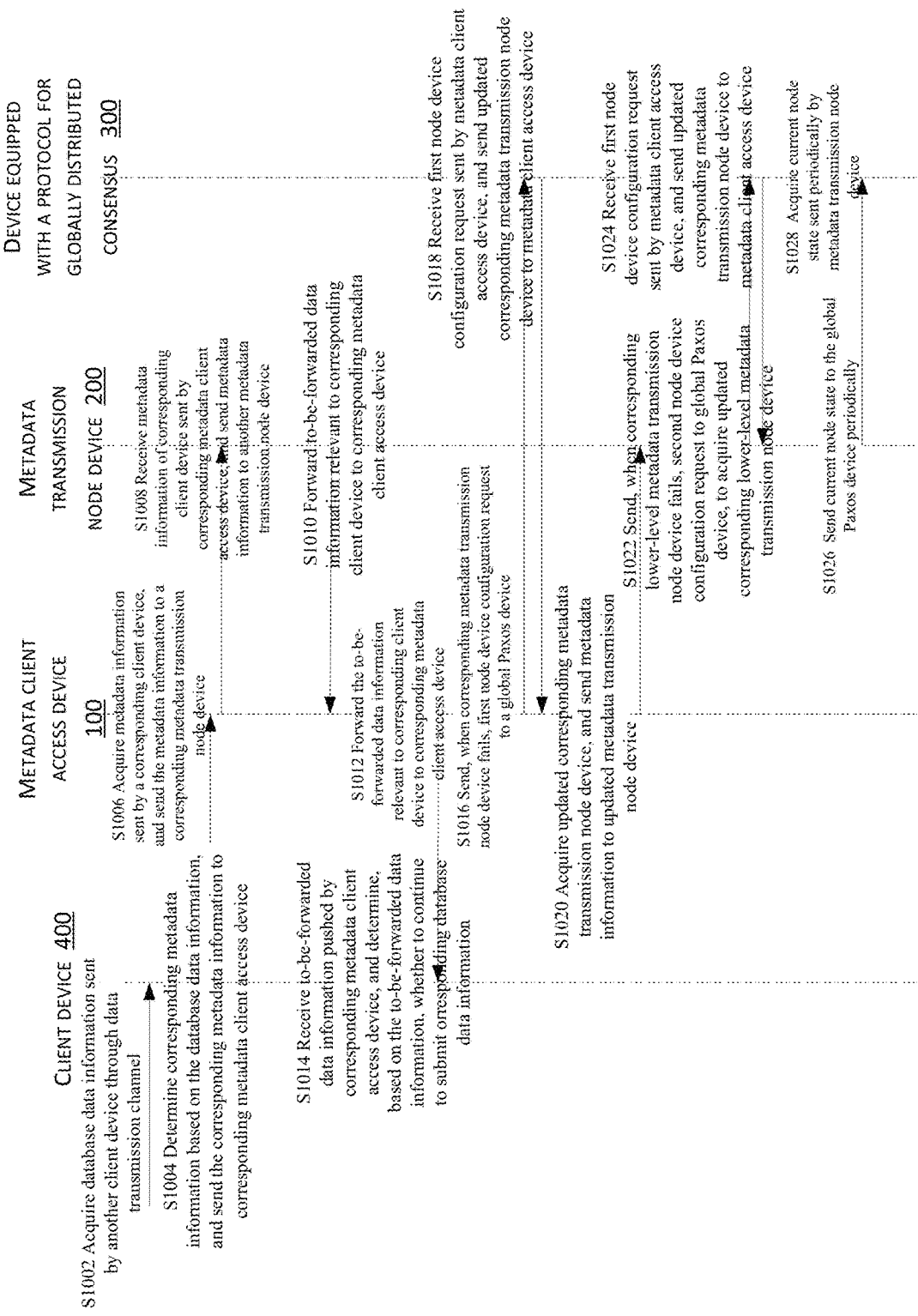
FIG. 10 is a schematic flow chart of an integral method of interaction between system devices for cross-regional data transmission according to a further aspect of the present disclosure.

FIG. 10 is a schematic flow chart of an integral method of interaction between system devices for cross-regional data transmission according to a further aspect of the present disclosure. The method includes step S1002, step S1004, step S1006, step S1008, step S1010, step S1012, step S1014, step S1016, step S1018, step S1020, step S1022, step S1024, step S1026, and step S1028. Wherein, in the step S1002, database data information sent by another client device through a data transmission channel is acquired; in the step S1004, corresponding metadata information is determined based on the database data information, and sent to a corresponding metadata client access device; in the step S1006, metadata information sent by a corresponding client device is acquired, and the metadata information is sent to a corresponding metadata transmission node device; in the step S1008, metadata information of a corresponding client device sent by a corresponding metadata client access device is received, and the metadata information is sent to another metadata transmission node device; in the step S1010, the to-be-forwarded data information relevant to the corresponding client device is sent to the corresponding metadata client access device; in the step S1012, the to-be-forwarded data information relevant to the corresponding client device is sent to the corresponding metadata client access device; in the step S1014, to-be-forwarded data information pushed by a corresponding metadata client access device is received, and whether to continue to submit the corresponding database data information is determined based on the to-be-forwarded data information; in the step S1016, when the corresponding metadata transmission node device fails, a first node device configuration request is sent to a device equipped with a protocol for globally distributed consensus; in the step S1018, a first node device configuration request sent by the metadata client access device is received, and an updated corresponding metadata transmission node device is sent to the metadata client access device; in the step S1020, the updated corresponding metadata transmission node device is acquired, and the metadata information is sent to the updated metadata transmission node device; in the step S1022, when a corresponding lower-level metadata transmission node device fails, a second node device configuration request is sent to a device equipped with a protocol for globally distributed consensus, to acquire an updated corresponding lower-level metadata transmission node device; in the step S1024, the first node device configuration request sent by the metadata client access device is received, and the updated corresponding metadata transmission node device is sent to the metadata client access device; in the step S1026, a current node state is sent to the device equipped with a protocol for globally distributed consensus periodically; and in the step S1028, the current node state sent periodically by the metadata transmission node device is acquired.

In the above example embodiment of the present disclosure, the metadata information includes data replication progress information of the corresponding client device; and the to-be-forwarded data information includes data replication progress information of another corresponding client device.

Figure 11:
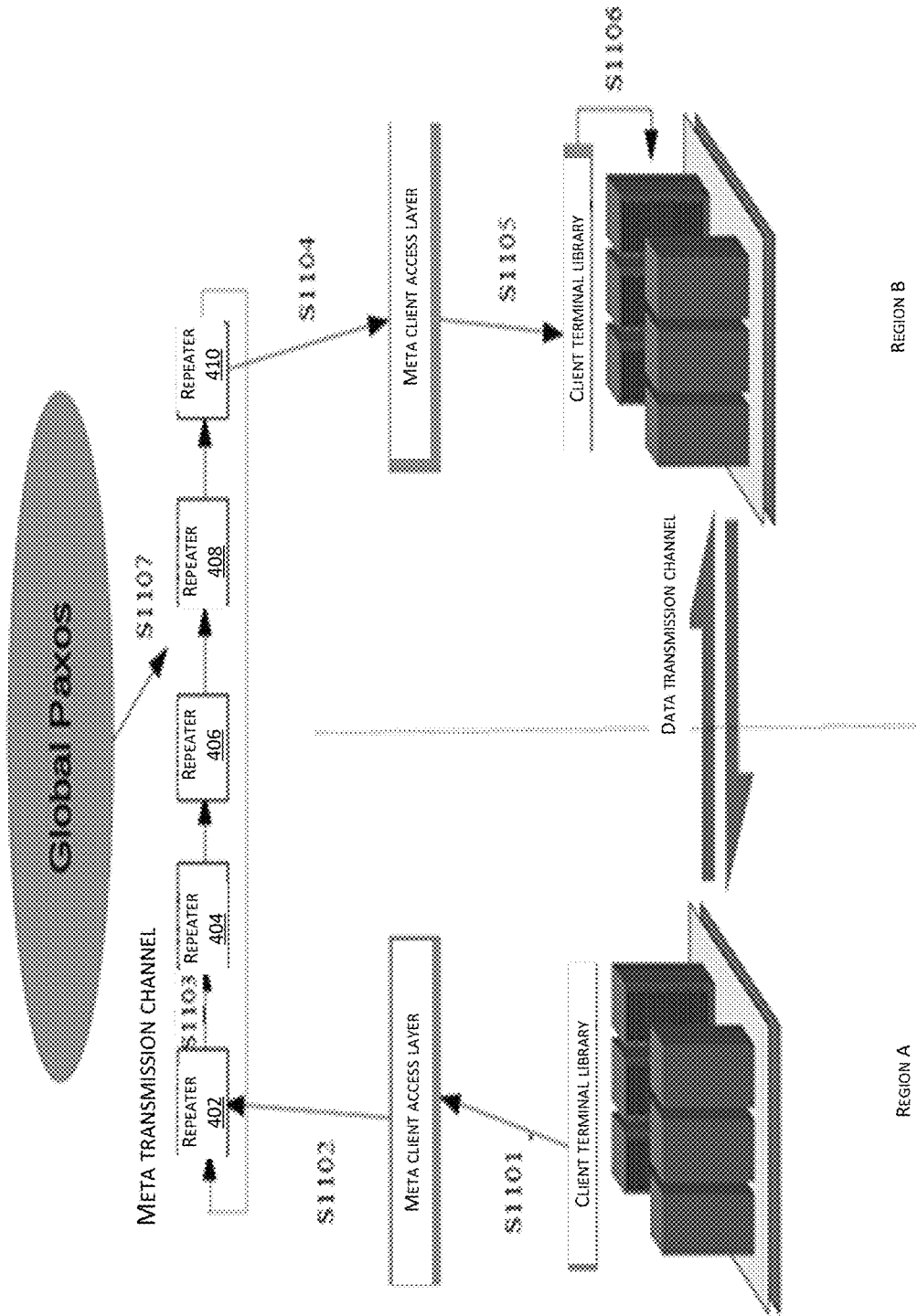
FIG. 11 is a schematic flow chart of an integral method of cross-regional data transmission in an example embodiment according to an aspect of the present disclosure.

FIG. 11 is a schematic flow chart of an integral method of cross-regional data transmission in an example embodiment according to an aspect of the present disclosure. The method mainly includes step S1101, step S1102, step S1103, step S1104, step S1105, step S1106, and step S1107.

Wherein the step S1101 includes: acquiring database data information sent by another client device (a client terminal library in a region B) through a data transmission channel, and determining corresponding metadata information based on the database data information, wherein the metadata information includes data replication progress information of a corresponding client device (a client terminal library in a region A), and sending the metadata information to a corresponding metadata client access device (a meta client access layer in the region A); the step S1102 includes: acquiring the metadata information sent by the corresponding client device (the client terminal library in the region A), and sending the metadata information to a corresponding metadata transmission node device (repeater), wherein the metadata information includes data replication progress information of the corresponding client device; the step S1103 includes: receiving the metadata information of the corresponding client device (the client terminal library in the region A) sent by the corresponding metadata client access device (the meta client access layer in the region A), wherein the metadata information includes data replication progress information of the corresponding client device, and sending the metadata information to another metadata transmission node device (repeater); receiving to-be-forwarded data information sent by a corresponding upper-level metadata transmission node device (repeater), and processing the to-be-forwarded data information and then sending the processed to-be-forwarded data information to a corresponding lower-level metadata transmission node device, wherein the to-be-forwarded data information includes data replication progress information of another client device; the step S1104 includes: forwarding the to-be-forwarded data information relevant to the corresponding client device (the client terminal library in the region B) to the corresponding metadata client access device (a meta client access layer in the region B); the step S1105 includes: acquiring to-be-forwarded data information sent by the corresponding metadata transmission node device (repeater), and pushing the to-be-forwarded data information to the corresponding client device (the client terminal library in the region B), wherein the to-be-forwarded data information includes data replication progress information of another client device; the step S1106 includes: receiving the to-be-forwarded data information pushed by the corresponding metadata client access device (the meta client access layer in the region B), wherein the to-be-forwarded data information includes data replication progress information of another corresponding client device, and determining, based on the to-be-forwarded data information, whether to continue to submit the corresponding database data information; the step S1107 includes: receiving a first node device configuration request sent by a metadata client access device (meta client access layer) based on failure of a corresponding metadata transmission node device (e.g., repeater 402); receiving a second node device configuration request sent by a metadata transmission node device (e.g., repeater 406) based on failure of a lower-level metadata transmission node device (e.g., repeater 408); updating the corresponding metadata transmission node device (the repeater in the metadata transmission channel) based on the first node device configuration request and/or the second node device configuration request; acquiring a current node state sent by the metadata transmission node device periodically and pushing configuration of a repeater in a healthy state in the metadata transmission channel to each repeater.

Compared with conventional techniques, according to the cross-regional data transmission method and device in the example embodiments of the present disclosure, metadata information sent by a corresponding client device is acquired, and the metadata information is sent to a corresponding metadata transmission node device, wherein the metadata information includes data replication progress information of the corresponding client device; to-be-forwarded data information sent by the corresponding metadata transmission node device is acquired, and the to-be-forwarded data information is pushed to the corresponding client device, wherein the to-be-forwarded data information includes data replication progress information of another client device, so that the metadata information sent by the corresponding client device is effectively sent to the corresponding metadata transmission node device; and the acquired to-be-forwarded data information sent by the corresponding metadata transmission node device is pushed to the corresponding client device, to achieve synchronization of the metadata information.

Further, according to the cross-regional data transmission method and device in the example embodiments of the present disclosure, metadata information of a corresponding client device sent by a corresponding metadata client access device is received, wherein the metadata information includes data replication progress information of the corresponding client device, and the metadata information is sent to another metadata transmission node device; further, to-be-forwarded data information sent by a corresponding upper-level metadata transmission node device is received, and the to-be-forwarded data information is processed and then sent to a corresponding lower-level metadata transmission node device, wherein the to-be-forwarded data information includes data replication progress information of another client device; the to-be-forwarded data information relevant to the corresponding client device is forwarded to the corresponding metadata client access device, and metadata information of the corresponding client device sent from the corresponding metadata client access device is effectively sent to another metadata transmission node device; and the to-be-forwarded data information sent by the corresponding upper-level metadata transmission node device is processed and then sent to the lower-level metadata transmission node device, until the to-be-forwarded data information is received by all the metadata transmission node devices, to ensure that the metadata transmission node device forwards the to-be-forwarded data information relevant to the corresponding client device to the corresponding metadata client access device, thus effectively ensuring a high throughput rate between the metadata transmission node devices in the cross-regional data transmission.

Further, according to the cross-regional data transmission method and device in the example embodiments of the present disclosure, a first node device configuration request sent by a metadata client access device based on failure of a corresponding metadata transmission node device is received; a second node device configuration request sent by the metadata transmission node device based on failure of a lower-level metadata transmission node device is received; the corresponding metadata transmission node device is updated based on the first node device configuration request and/or the second node device configuration request, so that the metadata transmission node device does not need to query the device equipped with a protocol for globally distributed consensus about configuration management, and a configuration management problem of a low-frequency cross-regional metadata transmission node device in the case of service failover is solved effectively; further, a current node state sent periodically by the metadata transmission node device is acquired, so that the device equipped with a protocol for globally distributed consensus updates the corresponding metadata transmission node device timely, to ensure a high throughput rate of the cross-regional data transmission.

Further, according to the cross-regional data transmission method and device in the example embodiments of the present disclosure, database data information sent by another client device through a data transmission channel is acquired; corresponding metadata information is determined based on the database data information, wherein the metadata information includes data replication progress information of the corresponding client device, and the metadata information is sent to a corresponding metadata client access device, which effectively ensures synchronization of the metadata information corresponding to the database data information; further, to-be-forwarded data information pushed by the corresponding metadata client access device is received, wherein the to-be-forwarded data information includes data replication progress information of another corresponding client device, and it is determined, based on the to-be-forwarded data information, whether to continue to submit the corresponding database data information, which effectively ensures that synchronization delay of the database data information is not affected.

It should be noted that the present disclosure may be implemented in software and/or a combination of software and hardware, for example, an application specific integrated circuit (ASIC), a general-purpose computer or any other similar hardware devices can be used for implementing the present disclosure. In one example embodiment, a software program of the present disclosure may be executed by a processor to achieve the steps or functions described above. Similarly, the software program (including a related data structure) of the present disclosure can be stored into a computer readable recording medium, for example, a RAM memory, a magnetic or optical drive or a floppy disk and similar devices. In addition, some steps or functions of the present disclosure may be implemented with hardware, for example, a circuit that performs various steps or functions in cooperation with the processor.

In addition, a part of the present disclosure can be applied as a computer program product, for example, a computer program instruction, and when it is executed by a computer, the method and/or the technical solution according to the present disclosure can be called or provided through operations of the computer. The program instruction that calls the method of the present disclosure may be stored in a fixed or removable recording medium, and/or transmitted by means of broadcast or data streams in other signal carrying media, and/or stored in a working memory of a computer device that runs according to the program instruction. Herein, an example embodiment according to the present disclosure includes an apparatus, the apparatus including a memory configured to store a computer program instruction and a processor configured to execute the program instruction, wherein, when the computer program instruction is executed by the processor, the apparatus is triggered to run the method and/or the technical solution based on the multiple example embodiments of the present disclosure.

For those skilled in the art, it is apparent that the present disclosure is not limited to the details of the foregoing exemplary example embodiments, and the present disclosure can be implemented in other specific forms without departing from the spirit or basic features of the present disclosure. Therefore, from whichever perspective, the example embodiments are regarded as exemplary instead of being restrictive, the scope of the present disclosure is defined by the appended claims instead of the above description, and thus the present disclosure is intended to cover all changes falling in the meaning and scope of the equivalent elements. None of the reference signs in the claims should be regarded as limiting the involved claims. In addition, it is apparent that the wording "include" does not exclude other units or steps, and the singular form does not exclude the plural form. Multiple units or devices stated in the device claims may also be implemented by one unit or device through software or hardware. Terms such as "first" and "second" are used to represent names, but do not indicate any specific order.

What is claimed is:

1. A method comprising:
acquiring metadata information sent by a client device, the metadata information including first data replication progress information of the client device;
sending the metadata information to a first metadata transmission node device;
acquiring to-be-forwarded data information sent by the first metadata transmission node device; and
pushing the to-be-forwarded data information to the client device, the to-be-forwarded data information including second data replication progress information of another client device.

2. The method of claim 1, further comprising:
performing persistence processing on the metadata information.

3. The method of claim 2, further comprising:
sending persistence acknowledgment information to the client device.

4. The method of claim 1, further comprising:
sending, when the first metadata transmission node device fails, a first node device configuration request to a device equipped with a protocol for globally distributed consensus;
deleting, based on the first node device configuration request, the first metadata transmission node device from a meta transmission channel; and
adding a second metadata transmission node device with a healthy state in the meta transmission channel.

5. The method of claim 4, further comprising:
sending the metadata information to the second metadata transmission node device.

6. The method of claim 4, wherein the protocol for globally distributed consensus is Paxos.

7. A method comprising:
receiving metadata information of a client device sent by a metadata client access device;
sending the metadata information to a metadata transmission node device, the metadata information including first data replication progress information of the client device;
receiving to-be-forwarded data information sent by an upper-level metadata transmission node device;
sending the to-be-forwarded data information to a first lower-level metadata transmission node device, the to-be-forwarded data information including second data replication progress information of another client device; and
forwarding the to-be-forwarded data information to the metadata client access device.

8. The method of claim 7, further comprising:
sending, when the first lower-level metadata transmission node device fails, a node device configuration request to a device equipped with a protocol for globally distributed consensus;
deleting, based on the node device configuration request, the first lower-level metadata transmission node device from a meta transmission channel; and
adding a second lower-level metadata transmission node device with a healthy state in the meta transmission channel.

9. The method of claim 8, further comprising:
sending the to-be-forwarded data information to the second lower-level metadata transmission node device.

10. The method of claim 8, wherein the protocol for globally distributed consensus is Paxos.

11. The method of claim 8, further comprising:
sending a current node state to the device equipped with a protocol for globally distributed consensus periodically.

12. A system comprising:
a metadata client access device;
a metadata transmission node device; and
a client device,
wherein the metadata client access device includes a first acquisition unit that acquires metadata information sent by the client device, and sends the metadata information to the metadata transmission node device, the metadata information including first data replication progress information of the client device and a pushing unit that acquires to-be-forwarded data information sent by the metadata transmission node device, and pushes the to-be-forwarded data information to the client device, the to-be-forwarded data information including second data replication progress information of another client device.

13. The system of claim 12, wherein the metadata transmission node device includes:
a first reception unit that receives the metadata information of the client device sent by the metadata client access device, and sends the metadata information to another metadata transmission node device.

14. The system of claim 13, wherein the metadata transmission node device further includes:
a first forwarding unit that receives the to-be-forwarded data information sent by an upper-level metadata transmission node device, and sends the to-be-forwarded data information to a lower-level metadata transmission node device.

15. The system of claim 14, wherein the metadata transmission node device further includes:
a second forwarding unit that forwards the to-be-forwarded data information to the metadata client access device.

16. The system of claim 15, wherein the client device includes:
a third acquisition unit that acquires database data information sent by another client device through a data transmission channel.

17. The system of claim 16, wherein the client device further includes:
a sending unit that determines the metadata information based on the database data information, and sends the metadata information to the metadata client access device.

18. The system of claim 17, wherein the client device further includes:
a determination unit that receives the to-be-forwarded data information pushed by the metadata client access device, and determines, based on the to-be-forwarded data information, whether to submit the database data information.

* * * * *